US012639747B2

(12) United States Patent
Sathe et al.

(10) Patent No.: US 12,639,747 B2
(45) Date of Patent: May 26, 2026

(54) METHOD AND SYSTEM FOR ENERGY TRANSACTION PLATFORM

(71) Applicant: SMART ENERGY SYSTEMS, INC., Irvine, CA (US)

(72) Inventors: Neetika Sathe, Georgetown (CA); Abhinav Tiwari, Burlington (CA); Anastasia Boutziouvis, Ottawa (CA); Adam Epstein, Guelph (CA); Nitin Bajaj, Brampton (CA); Geri Yin, Woodbridge (CA); Hamza Mortage, Toronto (CA); Ranveer Reehal, Caledon (CA); Curtis Miles, Milton (CA)

(73) Assignee: SMART ENERGY SYSTEMS, INC., Irvine, CA (US)

( * ) Notice: Subject to any disclaimer, the term of this patent is extended or adjusted under 35 U.S.C. 154(b) by 571 days.

(21) Appl. No.: 17/890,925

(22) Filed: Aug. 18, 2022

(65) Prior Publication Data

US 2024/0062280 A1 Feb. 22, 2024

(51) Int. Cl.
*G06Q 30/08* (2012.01)

(52) U.S. Cl.
CPC .................................... *G06Q 30/08* (2013.01)

(58) Field of Classification Search
CPC ...................................................... G06Q 30/08
See application file for complete search history.

(56) References Cited

U.S. PATENT DOCUMENTS 7,835,973 B2 11/2010 Shields et al.
9,480,188 B2 10/2016 Orsini et al.
(Continued)

FOREIGN PATENT DOCUMENTS

AU 2018101013 8/2018
AU 2018101013 A4 8/2018
(Continued)

OTHER PUBLICATIONS

A. Sadiq, M. U. Javed, R. Khalid, A. Almogren, M. Shafiq and N. Javaid, "Blockchain Based Data and Energy Trading in Internet of Electric Vehicles," in IEEE Access, vol. 9, pp. 7000-7020, 2021 (Year: 2021).*

(Continued)

*Primary Examiner* — Jeffrey A. Smith
*Assistant Examiner* — Latasha D Ramphal
(74) *Attorney, Agent, or Firm* — BRYAN CAVE LEIGHTON PAISNER LLP

(57) ABSTRACT

There is provided an energy transaction platform to facilitate a wholesale↔distribution↔DER owner marketplace for DER-based energy products, including contracting, delivery, and settlement, for example, based on blockchain technology. The platform provides components to enrol and verify DER owners having a DER device. Platform components define and communicate contracts for energy services for bidding by DER owners to facilitate e.g. EV charging, GHG reduction, or demand response goals. Contracts are cleared in response to bidding, for example, by DER owners. The platform triggers contract delivery, which delivery is monitored and confirmed. Settlement is made between contract parties according to confirmed participation. Participation rewards and/or credit tokens are transferrable to DER owners, which can be further transferred. DER owner credibility measures can encourage participation and assist with clearing contracts. The platform can use blockchain smart contracts for events and store data to the blockchain.

25 Claims, 17 Drawing Sheets

(56) References Cited

U.S. PATENT DOCUMENTS

| | | | |
|---|---|---|---|
| 10,348,086 B2 | 7/2019 | Mokhtari et al. | |
| 10,485,144 B2 | 11/2019 | Orsini et al. | |
| 10,559,035 B2 | 2/2020 | Mueller et al. | |
| 10,585,445 B2 | 3/2020 | Wong et al. | |
| 10,643,288 B2 | 5/2020 | Orsini et al. | |
| 10,649,429 B2 | 5/2020 | Orsini | |
| 10,673,273 B2 | 6/2020 | Ghaemi et al. | |
| 10,684,636 B2 | 6/2020 | Wong et al. | |
| 10,740,775 B2 | 8/2020 | Hammerstrom et al. | |
| 10,778,773 B2 | 9/2020 | Wheeler | |
| 10,784,715 B2 | 9/2020 | Orsini | |
| 10,861,112 B2 | 12/2020 | Forbers, Jr. et al. | |
| 10,965,136 B2 | 3/2021 | Wheeler | |
| 2003/0216971 A1* | 11/2003 | Sick | G06Q 30/08 705/7.36 |
| 2014/0074645 A1* | 3/2014 | Ingram | G06Q 30/08 705/26.4 |
| 2015/0134440 A1 | 5/2015 | Vespasiani | |
| 2017/0067946 A1 | 3/2017 | Wheeler | |
| 2018/0293573 A1* | 10/2018 | Ortiz | G06Q 20/321 |
| 2019/0050949 A1 | 2/2019 | Orsini | |
| 2019/0139159 A1* | 5/2019 | Sarker | G06Q 30/08 |
| 2019/0181670 A1 | 6/2019 | Wheeler | |
| 2020/0027096 A1 | 1/2020 | Cooner | |
| 2020/0076198 A1 | 3/2020 | Beckmann et al. | |
| 2020/0120835 A1 | 4/2020 | Orsini et al. | |
| 2020/0148072 A1 | 5/2020 | Ashley et al. | |
| 2020/0301386 A1 | 9/2020 | Orsini | |
| 2020/0409319 A1 | 12/2020 | Ma et al. | |
| 2020/0412809 A1 | 12/2020 | Wheeler | |
| 2021/0012013 A1 | 1/2021 | Gourisetti et al. | |
| 2021/0098988 A1 | 4/2021 | Gokhale et al. | |
| 2021/0210966 A1 | 7/2021 | Wheeler | |
| 2021/0221247 A1 | 7/2021 | Daniel et al. | |
| 2021/0224238 A1 | 7/2021 | Orsini | |
| 2022/0164902 A1 | 5/2022 | Thoresen | |
| 2022/0179378 A1 | 6/2022 | Gourisetti et al. | |
| 2022/0351170 A1* | 11/2022 | Storiale | G06Q 20/4016 |

FOREIGN PATENT DOCUMENTS

| | | |
|---|---|---|
| CA | 2920924 | 3/2015 |
| CA | 3004649 | 6/2017 |
| CA | 3036431 A1 | 3/2018 |
| CA | 3062186 | 11/2018 |
| WO | 2018049504 A1 | 3/2018 |
| WO | WO2019084262 | 5/2019 |

OTHER PUBLICATIONS

Liu, et al., "Blockchain Based Energy Trading Model for Electric Vehicle Charging Schemes," SmartGIFT 2018, LNICST 245, pp. 64-72, 2018.

Sciume et al., "Demand Response Service Certification and Customer Baseline Evaluation Using Blockchain Technology," IEEE Access, vol. 8, pp. 139313-139331, 2020.

Liu, C., et al. *Blockchain Based Energy Trading Model for Electric Vehicle Charging Schemes* (Jul. 7, 2018).

Sciume et al., *Demand Response Service Certification and Customer Baseline Evaluation Using Blockchain Technology* (Jul. 29, 2020).

* cited by examiner

300A

300B

METHOD AND SYSTEM FOR ENERGY TRANSACTION PLATFORM

FIELD OF INVENTION

This application relates to energy generation, distribution and consumption and computing systems and more particularly to a method and system for an energy transaction platform, for example, using blockchain technology.

BACKGROUND

Small-scale electricity supply or demand resources that are interconnected to an energy distribution network (e.g. an electric grid) are commonly referenced as Distributed Energy Resources (DERs). DERs as generators are often renewable energy based, leveraging, solar, wind, geothermal, or waste-based (e.g. biomass, biogas) resources. Demand resources include distributed energy storage systems such as a battery of an electric vehicle or an electrochemical storage battery (e.g. a flow battery), for example.

There are many complications associated with employing DERs in the energy generation, distribution and consumption contexts. Often, reliability issues are associated with renewal resources like wind and solar, yet demand for electricity does not reduce pace when such sources are unavailable. As well, many DERs are operated by non-traditional energy producers: DERs are typically owned and operated by energy consumers such as residential energy consumers. Such energy consumers are not usually accustomed to contracting for, and supplying and/or receiving energy to satisfy the wider needs of an electric grid.

Yet, DERs provide opportunities for energy networks to be managed toward various goals such as greener energy production and consumption.

Computer platforms, including blockchain-based platforms, provide technology to assist with transactions between distributed entities such as participants of an energy distribution network.

There is a need for an energy transaction platform for reliably integrating DERs into an energy distribution network.

SUMMARY

According to embodiments, an energy transaction platform facilitates a wholesale ↔distribution ↔DER owner marketplace for DER-based energy products, including contracting, delivery, and settlement. Such platforms can be, but need not be, based on enterprise blockchain technology. The platform provides components to enrol and verify DER owners having a DER device. Platform components define and communicate contracts for energy services for bidding by DER owners to facilitate, for example, electric vehicle (EV) charging, green house gas (GHG) reduction, or demand response goals, among others. Contracts can be cleared automatically and transparently in response to bidding, for example, by DER owners. The platform can trigger contract delivery, which delivery is monitored and confirmed. Settlement can be made between contract parties according to confirmed participation. The platform computes and utilizes DER owner credibility, for example, to encourage participation and assist with clearing contracts. Examples of the platform use blockchain smart contracts for events and stores data to the blockchain. Participation rewards are transferrable to DER owners to spend with merchants. Tokens can be given under a credit program, and the credits transferred via a credits marketplace.

The energy transaction platform can be used to make decisions involving the generation, distribution, and consumption of energy. Energy behaviours can be incentivized and values assigned. The values can be transferred to others such as via a credits market.

A computing device can provide a platform for transacting energy services and can comprise one or more processors coupled to a storage device storing computer readable instructions that, when executed by the one or more processors, cause the computing device to: receive a quote for providing a market service, the quote received from a quote initiator to establish at least one contract for providing the market service, wherein the market service is a selected one of a plurality of market services for energy generation, distribution or consumption; communicate the quote to a plurality of quote bidders, each quote bidder associated with a distributed energy resource (DER) device capable of performing the market service; receive respective tenders in reply to the quote, the respective tenders received from at least some of the plurality of quote bidders; store the quote and the respective tenders to a data store; perform market clearing operations to automatically and transparently clear the tenders, storing market clearing result information to the data store, and for a respective tender accepted for the quote by the market clearing operations: establish a respective contract between the quote initiator and a respective quote bidder associated with the respective tender in response to the quote and the respective tender; communicate to control the DER device associated with the respective quote bidder to perform the energy service in accordance with the respective contract; verify the participation of the DER device associated with the respective quote bidder in performance of the energy service; and store the participation as verified to the data store.

In an example, the quote initiator can be a contract counterparty and the quote bidders can be any one or more of: residential customers of the contract counterparty having respective DER devices; institutional, commercial & industrial (IC&I) customers of the contract counterparty having respective DER devices; or DER device aggregators having a relationship with owners of DER devices for providing the market services.

In an example, the quote initiator can be a market operator and the quote bidders can be one or more contract counterparties to the market operator, the one or more contract counterparties having relationships with any one or more of customers having DER devices or DER device aggregators having a relationship with owners of DER devices for providing the market services.

In an example, the quote initiator can be a DER device aggregator having a relationship with owners of DER devices and the quote bidders can be the owners of the DER devices.

In an example, the quote can define a second quote that is linked to a first quote; the quote initiator of the second quote can be a quote bidder providing a respective tender for the first quote; and the market clearing operations for the second quote can operate to only accept tenders for the second quote if market clearing operations for the first quote accepted the respective tender for the first quote by the quote initiator of the second quote.

In an example, the market services can comprise one of electric vehicle charging, green house gas reduction, or demand response market services.

In an example, responsive to the participation as verified, the instructions can cause the computing device to: instruct payment settlement in accordance with the contract; and store payment results to the data store. In an example, the participation is verified by an independent third party service and recorded in an immutable and verifiable manner.

In an example, responsive to the participation as verified, the instructions can cause the computing device to: record an amount of tokens to an account of the respective quote bidder stored on the data store, wherein the amount of tokens can be responsive to either or both of: an amount of payment in accordance with the contract; or a verified performance measure related to the energy service. In an example, the respective quote bidder can be a residential customer and the amount of tokens can be rewards that are spendable for a merchant product or service at merchants participating in a rewards program maintained using the blockchain. In an example, the instructions can cause the computing device to record the amount of tokens to an account of the respective quote bidder stored on a blockchain. In an example, the tokens can reflect a verified performance measure of any one or more of: a green house gas reduction; or clean energy generated by a renewable or non-fossil fuel source; or other energy behaviour. In an example, the amount of tokens can be determined in accordance with a regulatory or other program. In an example, the tokens can be transferable via a credits market.

In an example, the quote can comprises a credibility weighting factor for selecting between tenders in response to a credibility score associated to the quote bidder wherein the market clearing operations can be responsive to the credibility weighting factor and credibility scores of the quote bidders to maximize a likelihood of successful performance under respective contracts for the quote. In an example, the instructions can cause the computing device to determine a credibility score for the respective quote bidder, wherein the credibility score can be responsive to participation by the quote bidder in a set of recent quotes available for bidding by the respective quote bidder. In an example, for each of the quotes in the set of recent quotes: no bidding has a neutral impact to the credibility score; bidding or successful participation in a concluded contract has a positive impact to the credibility score; and cancellation or unsuccessful participation in the concluded contract has a negative impact to the credibility score. In an example, the positive impact or the negative impact can be weighted in response to the credibility weighting factor of a particular quote in the set of quotes.

In an example, the quote can comprises a gate defining a time within which to receive respective tenders in reply to the quote and the market clearing operations can be responsive to the gate.

In an example, the tender can comprise a participation rate for the DER device and the market clearing operations can be responsive to the participation rate for the DER device.

In an example, the market clearing operations can be responsive to any one or more of: bid price; quantity to be supplied or consumed; location of the DER device; type of the DER device; credibility weighting factor and user credibility score; participation rate of the tender; a time the tender is received; whether the DER device is previously scheduled for participation in another contract during a same time as performance of the contract under the quote.

In an example, the instructions can cause the computing device to: receive quote bidder information to enrol the quote bidder to the platform, the quote bidder information including DER device information with which to confirm the DER device; and communicate with a control agent for the DER device to verify eligibility to enrol.

In an example, the instructions can cause the computing device to provide an interface for a quote initiator to provide quote information defining the quote; and the interface for the quote initiator can be configured to present respective controls to receive the quote information in response to a selection of the market service.

In an example, the instructions cause the computing device to provide an interface for a quote bidder to provide default tender information for automatically replying to quotes from the quote initiator using the default tender information.

In an example, the computing device can comprise one peer device of a peer-to-peer network implementing the blockchain.

In an example, the instructions cause the computing device to, any one or more of:

- communicate with one or more control agents to control respective operations of the respective DER devices in accordance with contracts maintained by the platform;
- receive performance measures of the respective DER devices, the measures made during performance of the contracts, storing such measure for either or both of presenting to platform participants or verifying participation;
- receive participation verification information from one or more metering agents monitoring participation of the respective DER devices to verify respective participation in respective contracts;
- communicate blockchain information to participants in the platform for transparency of platform operations, the blockchain information including any one or more of: participant information, quote information, tender information; market clearing information, participation information for respective contracts; payment information; and token and/or rewards information;
- receive respective merchant product and merchant offer information and publish respective merchant offers for spending rewards issued in response to verified participation;
- communicate notifications of the quote to the plurality of quote bidders, the plurality of quote bidders determined in response to a) the market service and b) type of DER device associated with the quote bidder;
- for a respective quote bidder, any one or more of: provide an upcoming quotes interface for quotes available for a bid by the respective quote bidder; provide an in progress interface for tenders of the respective quote bidder accepted by the platform and where performance under an associated contract is not complete; and provide a history interface to present past event information comprising any one or more of tokens and/or reward spending information, information for each quote communicated for the respective quote bidder, including for quotes where no reply was communicated, quotes where a tender reply was not accepted, and quotes were the tender reply was accepted; and
- for a quote initiator any one or more of: provide an incoming services dashboard interface for presenting quote information for quotes received for bidding; provide an outgoing services dashboard interface presenting quote information for quotes initiated for bidding on by another platform participant; and provide a payments dashboard interface for presenting payment information for quotes.

Method and computer program product aspects as well as other devices, methods and computer program products will be apparent to a person of ordinary skill in the art.

DETAILED DESCRIPTION

Figure 1:
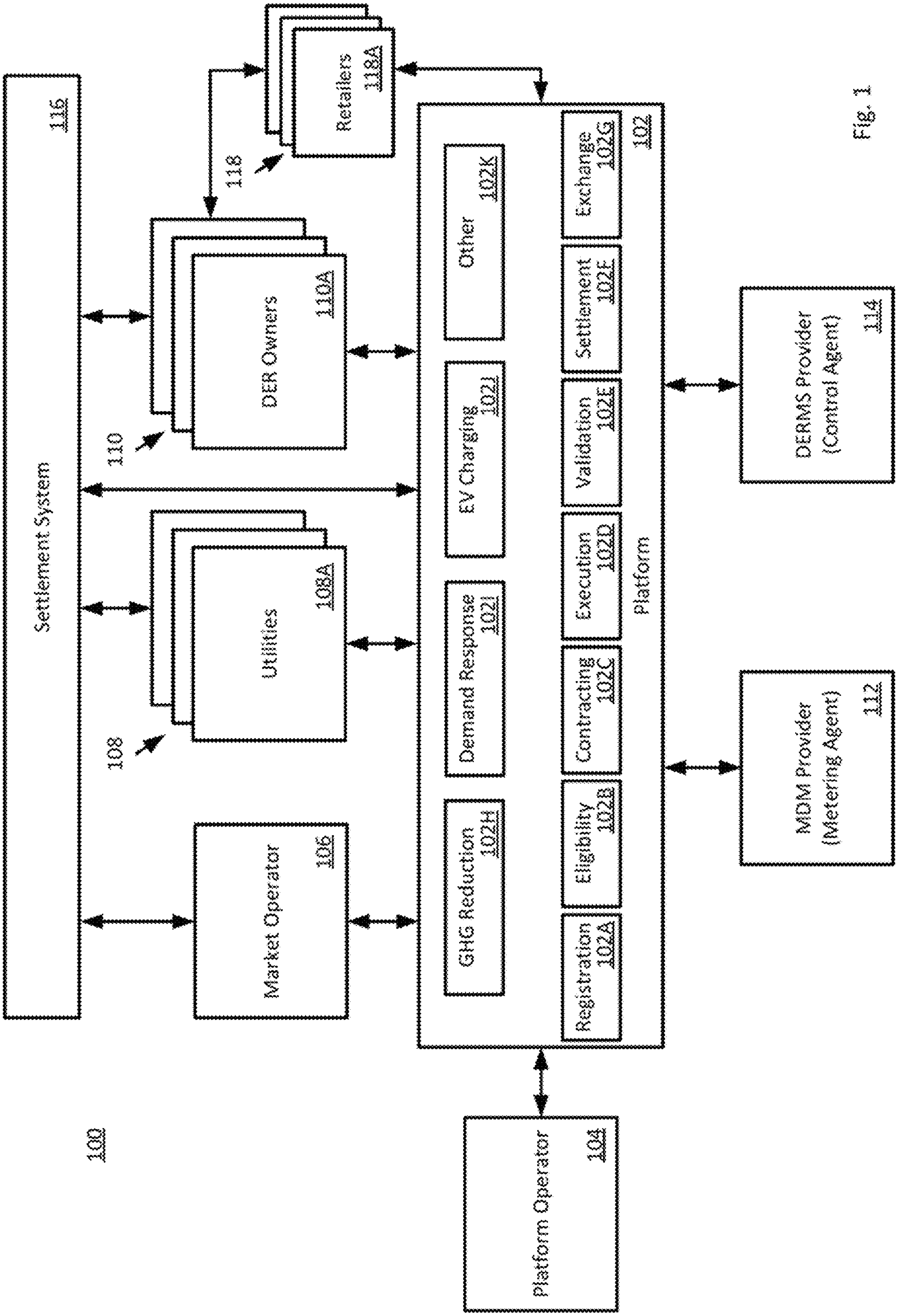
FIG. 1 is a computing environment consistent with teachings herein.

In accordance with an embodiment, there is provided a marketplace platform using blockchain technology for various participants, to act, directly or indirectly in the distribution of electricity for an electric grid. There are two types of participants. A primary participant is one who directly participates in the platform and hence submits transactions directly to the blockchain. A secondary participant is one who interacts through a primary participant. A secondary participant does not directly write to the blockchain. Secondary participants are sometimes used as a sub-participant in a transaction where a primary participant is directly participating. For instance, a set of secondary participants such as a contract counterparty/ies, or residential/ICI customer(s) (often referenced as customers) could be a part of a transaction where a contract counterparty, as a primary participant, is participating at an aggregated level on behalf of all connected secondary participants. A secondary participant, such as a payments provider, could play a sub-function within an overall settlement process handled by the settlement provider acting as a primary participant.

Roles and associated responsibilities of each participant, be it primary or secondary, may change across different services. For example, a primary participant such as a market operator may have a role within one service of the marketplace services while not having any role in a different service. On the other hand, a contract counterparty may have a large role as a primary participant in one service versus a limited role in another service. This applies to both primary and secondary participants.

Participant Definitions: below are definitions of various participants.

Residential User—A residential customer with Distributed Energy Resources (DERs) who has a capacity to consume energy from the grid, consume energy from the DERs or feed DER generated surplus energy back to the grid. That is, the residential customer has the ability to control the energy characteristics (i.e. level of generation or consumption) and/or timing thereof for the DER.

Institutional/Commercial/Industrial User—These three customers are typically categorized together as IC&I or ICIs due to their large load and hence demand requirements and typically larger on-site energy generations capabilities when acting as a prosumer—prosumer is an industry wide term used for the entities who are both energy producers and consumers. Customers with DERs are typically called prosumers as they both produce and consumer energy. Due to larger consumption and generation than their residential counterparts, ICI user requirements are often different than residential users and hence are treated differently by ISOs and also by LDCs. However, similar to residential users, they have Distributed Energy Resources (DERs) and have capacity to consume energy from the grid, consume energy from the DERs or feed DER generated surplus energy back to the grid. That is, the ICI customer has the ability to control the energy characteristics (i.e. level of generation or consumption) and/or timing thereof for the DER.

Contract Counterparty—This is an umbrella term used for a Local Distribution Company (e.g. a Utility) or an Energy Aggregator (a company who acts as intermediary between electricity end-users, who provide DERs, and those power system/electricity grid participants such as LDC who wish to use these energy services). A contract counterparty can act as both a primary and a secondary participant. A practical example to that is an energy aggregator (as a secondary participant) participating in the marketplace through an LDC/Utility (as a primary participant) where the aggregator acts as an aggregated prosumer on behalf of its customers who own the end devices (DERs).

Market Operator—The organization that runs the wholesale market for the electric grid. Examples of a Marker Operator are an Independent Service Operator (ISO) such as IESO (Independent Electric System Operator) in Ontario, Canada; and CAISO (California Independent Service Operator) in California, USA; and others.

Control Agent— A technology provider who can monitor and control the residential user or Institutional/Commercial/Industrial (ICI) user DERs. Control agents provide distributed energy management systems (DERMS) for controlling DERs.

Metering Agent—A technology provider who obtains DER energy consumption and supply data from energy meters installed at customer premises. Such data can include energy supplied back to the grid, and energy generated by DERs and consumed by the customer household (i.e. not supplied back to the grid). Metering agents can provide meter data management systems (MDMs).

Platform Operator—The organization who manages the marketplace platform infrastructure, its operation and functioning.

Marketplace Platform Users: There are two types of 'users' that need to be considered when building a blockchain-based application. 1. Users (real physical people) that log into the web application portal and use an application to interact with the blockchain; and 2. Users that are identified by certificates (e.g. X.509 certificates, public/private keys pairs) that are used to sign transactions and electronically submit them to the blockchain. These two types of users can be the same, but often this is not the case when building private/permissioned blockchain applications. This is due to the fact that whichever organization is responsible for building/operating/maintaining the web application that the users of type (1) interact with also has the ability to modify the code to make it look like any other user is the one that is performing type (2) interactions. As such, there is no increase to the level of trust in the system by assuming that every user of type (1) also has a certificate that enables them to be a user of type (2). Furthermore, the increased overhead and performance challenges of managing the necessary certificates becomes onerous.

In accordance with an embodiment, each of Market Operators, Contract Counterparties (on behalf of themselves and their customers (e.g. ICI and Residential Users), and the Platform Operator maintain user identity and access management capabilities (e.g. directories, etc.) to authenticate users who are connecting to the corresponding user application for that organization (e.g. a web-based application providing a user interface for the marketplace platform, appropriate to the needs of the respective user). The users in the directories will likely represent employees of the respective organization, or in the case of contract counterparties, employees or ICI/residential customers.

FIG. 1 is a computing environment 100 providing an energy transaction platform 102 (platform 102) consistent with teachings herein. Platform 102 comprises one or more computing devices comprising components to provide a wholesale H distribution H end user marketplace for DER-based energy products, including contracting, delivery, and settlement, based on enterprise blockchain technology.

Platform 102 is shown coupled to various other computing devices for primary and secondary participants. For example, platform 102 is coupled a platform operator device 104, a market operator device 106 for a market operator of the electricity grid, utilities devices 108 (with 108A as an example) for one or more contract counterparty participants, and DER owner devices 110 (with example 110A as an example) for one or more DER owners of the grid, for example, as secondary participants with an associated contract counterparty participant.

Platform 102 is further coupled to devices for additional primary participants, namely, a metering agent device 112 (MDM provider) and a control agent device 114 (DERMS provider). A settlement system 116 provides settlement services for the marketplace and is in communication with each of platform 102, system operator device 106, respective utilities devices 108, and respective DER owner devices 110. Finally, platform 102 is in communication with one or more retailer devices 118 (with 108A as an example) for one or more retailers. Respective devices 118 are in communication with respective DER owner devices 110, for example, to provide reward-based services providing incentives to use the marketplace of platform 102 as further described herein.

In accordance with an embodiment, platform 102 comprises various components including registration component 102A, eligibility component 102B, contracting component 102C, execution component 102D, validation component 102E, settlement component 102F, and exchange component 102G facilitating respective activities for marketplace participants. Components 102A-102G mirror a general flow of operations for respective participants and their interactions with platform 102. Participants respectively register with the platform, their eligibility is reviewed and approved (or not). Participants negotiate contracts for the supply of energy or restricting energy consumption. Contracts are executed (e.g. performed by respective parties thereto in accordance with the obligations set out in a concluded contract) and performance is validated. Settlement is performed in response to validation and exchange services can be performed.

In accordance with an embodiment, platform 102 is configured to offer different markets geared to achieving respective goals in respect of any of energy generation, distribution or consumption, for example. Platform 102 includes components to define various markets within the marketplace, namely a greenhouse gas (GHG) reduction component 102H for a GHG reduction market, a demand response (DR) component 102H for a DR market and an electronic vehicle (EV) charging component 102J for an EV charging market. For each type of market, platform 102 provides a bidding/auction with clearing procurement process. The market operator, via its respective device 106, utilizes platform 102 to define and communicate a request for participation in a contract for the supply of energy within a particular market. The request is communicated to each contract counterparty, for example, a utility, (via respective devices 118) that has registered to receive such requests to participate in the type of market to which the contract relates. A utility that desires to participate and make a bid replies via device 108A, for example, and also communicates requests to its customers (via respective devices 110) who have registered their DERs with the utility.

In accordance with an embodiment, participation in a particular contract is determined in response to various factors including, bid price, credibility weighting and user credibility, real energy contribution based on location, quantity, type of DER device, time of receipt of tender/bid, etc. Market clearing operations can sort or filter tenders based on such considerations such as by using rules or policies, which can be defined as smart contracts.

Platform 102 records transaction activities to a blockchain as described herein. Metering agent and control agent devices control DER activities, for example, to supply energy or to receive energy per terms of an accepted contract and confirm fulfilment of a DER owner's obligations. Metering agent and control agents record their monitoring/determining results to the blockchain of platform 102.

Platform 102 provides for flexibility in contracting. Scheduling, for example, can be: 1) Ad-hoc, on-demand for immediate activation (with scheduled duration/termination, or ad-hoc on-demand termination); 2) In advance, with schedule set by user (optionally, within eligibility windows set by the market operator); or 3) In advance, with schedule set by market operator (e.g. delivery windows (these can be contracted for separately and can be ad-hoc or in advance themselves), or availability windows (optional)). Price setting, for example, can be: 1) set by incoming bids and everyone gets the clearing price; 2) set by incoming bids and everyone gets the price they bid; or 3) set in the offer as a 'take-it-or-leave-it' price. Criteria for completion/payment can be based on quantity of energy delivered or load curtailed; or based on availability.

Performance based tokens can be generated or assigned. Some tokens may qualify for exchange on secondary markets (e.g. carbon offset certificates).

Platform 102 provides respective interfaces to participants such as market operators, contract counterparties and DER owners (e.g. customers of the contract counterparties) to conclude quotes for energy services. Each quote is directed to one of the configured market services. The interfaces to define a new quote are configured to enable the initiator (e.g. a market operator or contract counterparty) to choose the market service, and choose contracting terms, for example, scheduling and pricing options, quote reply options, etc. according to rules or policies and where input is received such as to choose particular values for such information. New quotes are communicated to recipients. DER owners as customers of a contract counterparty can be associated to receive new quotes from that contract counterparty. The new contract counterparty quotes can be communicated in response to the type of DER device owned, for example, so that new contract counterparty quotes for market services that are not supported by a DER device are not communicated to an owner thereof. In an embodiment, pricing to DER owners can be set by the contract counterparty as a "take it or leave it price", without an option for a DER owner to bid.

In accordance with an embodiment, the market services differ: 1) in the types of DER devices that can participate; 2) how those DER devices are requested to alter their behaviour to achieve an associated goal of the market service (e.g. an EV charging goal, a GHG reduction goal, and a Demand Response goal); 3) the contracting terms available to specify the details of the obligation; 4) how market clearing is performed; 5) how participation sufficiency is validated by the metering agent, and 6) what type of token (or tokens) is generated at successful completion. The interfaces and associated coding and/or smart contracts of platform 102 are configured accordingly.

In accordance with an embodiment, a mobile application or web app fora residential user device provides interfaces to: login; set up payment information with the settlement system; perform device registration for one or more DERs operated by the residential user, for example, where a control agent managing the DER determines eligibility to participate in services of the platform; set up program participation settings; submit bids (tenders) or indications of willingness to participate in upcoming opportunities, along with the proposed service delivery levels; monitor active and upcoming activities; view earning history; and spend tokens (e.g. at retailers).

In accordance with an embodiment, a web dashboard of a platform operator provides interfaces to: login; receive operational health/metrics information; receive historical participation and statistics; obtain reporting and data extract; receive payment processing history information; view notifications; and view errors. In accordance with an embodiment, end user mobile and web app, and platform operator dashboard may share middleware/application layer components for common capabilities. In an embodiment, common components comprise a restful application programming interface (REST API) (router); sockets; business logic (controllers); data model/data definitions (e.g. and a store for a metadata director); data access/storage (e.g. and stores for application data, user registry, reference data (one for Structured Query Language (SQL) and one for noSQL)); logging and error handling; and blockchain/fabric software developer kit (SDK) (e.g. as a shared apparatus for submitting transactions to the blockchain and being notified of events occurring by other participants, as a store for a Wallet, etc.)

In accordance with an embodiment, a web dashboard of a market operator provides interfaces to: login; review advanced distribution management system (ADMS)/network diagram; present market interaction forms; present an interactive timeline; present operational results/perform simulation; review payments information (payments made); view notifications; and view errors. In accordance with an embodiment, a web dashboard of a contract counterparty provides similar interfaces to those for a market operator. In accordance with an embodiment, these dashboards share middleware/application layer components for common capabilities. In an embodiment, common components comprise interfaces, access control; business logic, data models; data storage (e.g. and stores for state database with indexing, private data collections); logging and error handling.

In accordance with an embodiment, control agent middleware communicates to control agent APIs (e.g. cloud service/existing systems) and comprises components for: capability registration provider functions; user enrollment/un-enrollment and testing functions (e.g. of DERs); settings change handler functions; on-demand control handler functions; operational progress provider functions; and operational results functions. In accordance with an embodiment, metering agent middleware communicates to metering agent APIs (e.g. cloud service/existing systems) and comprises components for: agent registration provider functions; household enrollment/un-enrollment functions; participation verification handler functions; and participation results functions.

Figure 2:
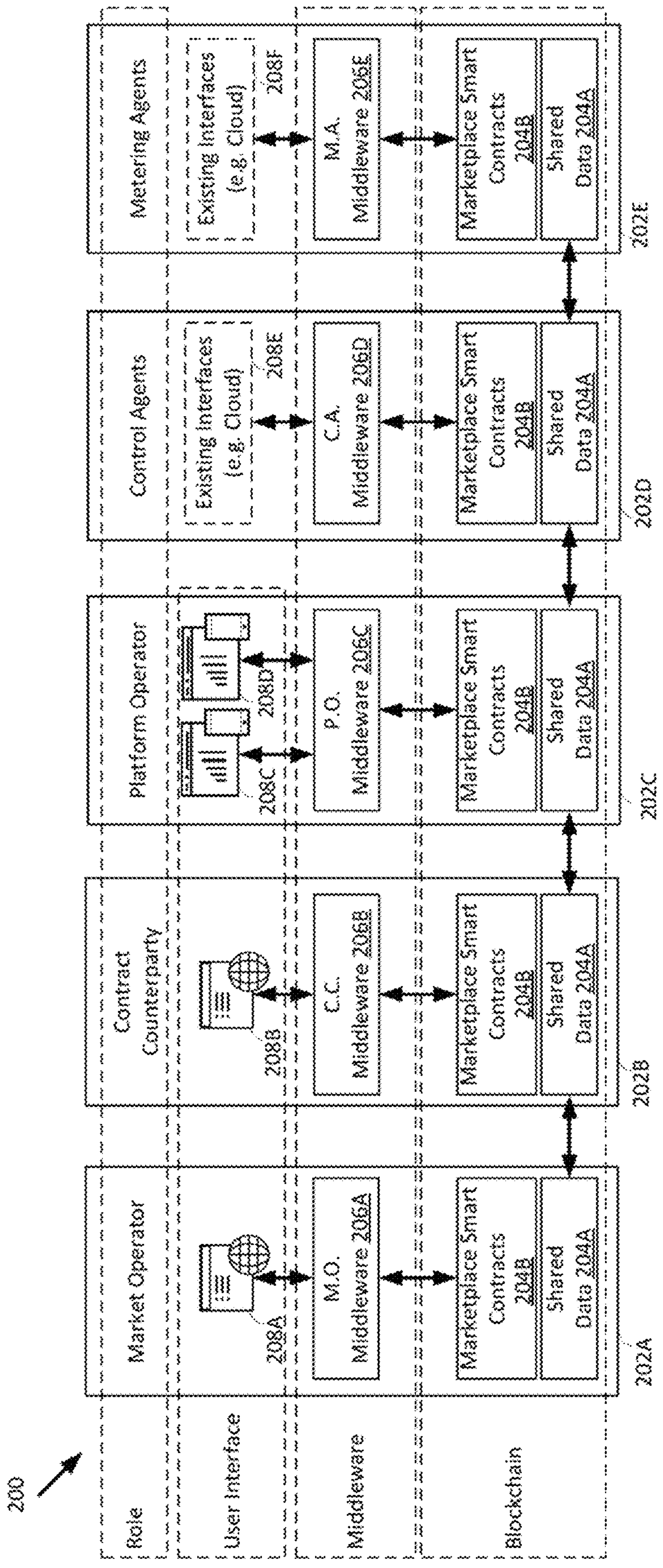
FIG. 2 is a diagram of architecture consistent with teachings herein.

FIG. 2 is a block diagram showing a high level architecture 200 of platform 102, notionally divided into views 202A-202E by primary participant roles, namely market operator, contract counterparties, platform operator, control agents and metering agents. It is understood that the primary participants interact with platform 102 via their respective devices 104, 106, 108, 112 and 114. At a lower level, the blockchain (generally 204) established a blockchain based ledger and shares data 204A between the participants. Blockchain 204 utilizes marketplace smart contracts 204B for respective participants, for example, to execute operations of the market based on activities on or off the blockchain. Examples of blockchain smart contracts include: bid submission; market clearing; recording of verification status; recording of payment; minting of performance-based tokens; and exchange of performance-based tokens. In an embodiment, the blockchain is implemented with Hyperledger Fabric (Hyperledger is a trademark of The Linux Foundation) and Kubernetes (Kubernetes is trademark of The Linux Foundation) for containerized applications and node.js (of the OpenJS Foundation), a JavaScript runtime (JavaScript is a trademark of Oracle America, Inc.) Access for respective participants is enabled via respective middleware components 206A-206E. Interaction is via respective user interfaces, which, for example, can be web-based, application based (e.g. for mobile devices), cloud-based or other type. Example interfaces include market operator web interface 208A, contract counterparty web interface 208B, respective application interfaces for ICI customers 208C and residential customer 208D. Interfaces 208C and 208D can be customized for respective Contract Counterparty 108 to whom the ICI and residential users are associated. In an embodiment the control agent interface(s) are cloud-based, and control agent and metering agent interfaces can be configured to work with respective agent interfaces that may pre-exist platform 102.

The respective interfaces provide access to blockchain data, for example, to present graphical user interface (GUI) views thereof. The interfaces for the market operator and contract counterparty enable these participants to initiate a new contract, initiate bids, review status, clear and perform the contract. Similarly, interfaces for ICI and residential users provide information regarding respective participation via a contract counterparty, monitor information regarding past, current and upcoming delivery or consumption curtailment instances, monitor tokens/rewards, etc. In an embodiment, the user interfaces 208A-208D provide interfaces for new participants to register and/or maintain registration/profile information.

Figure 3A:
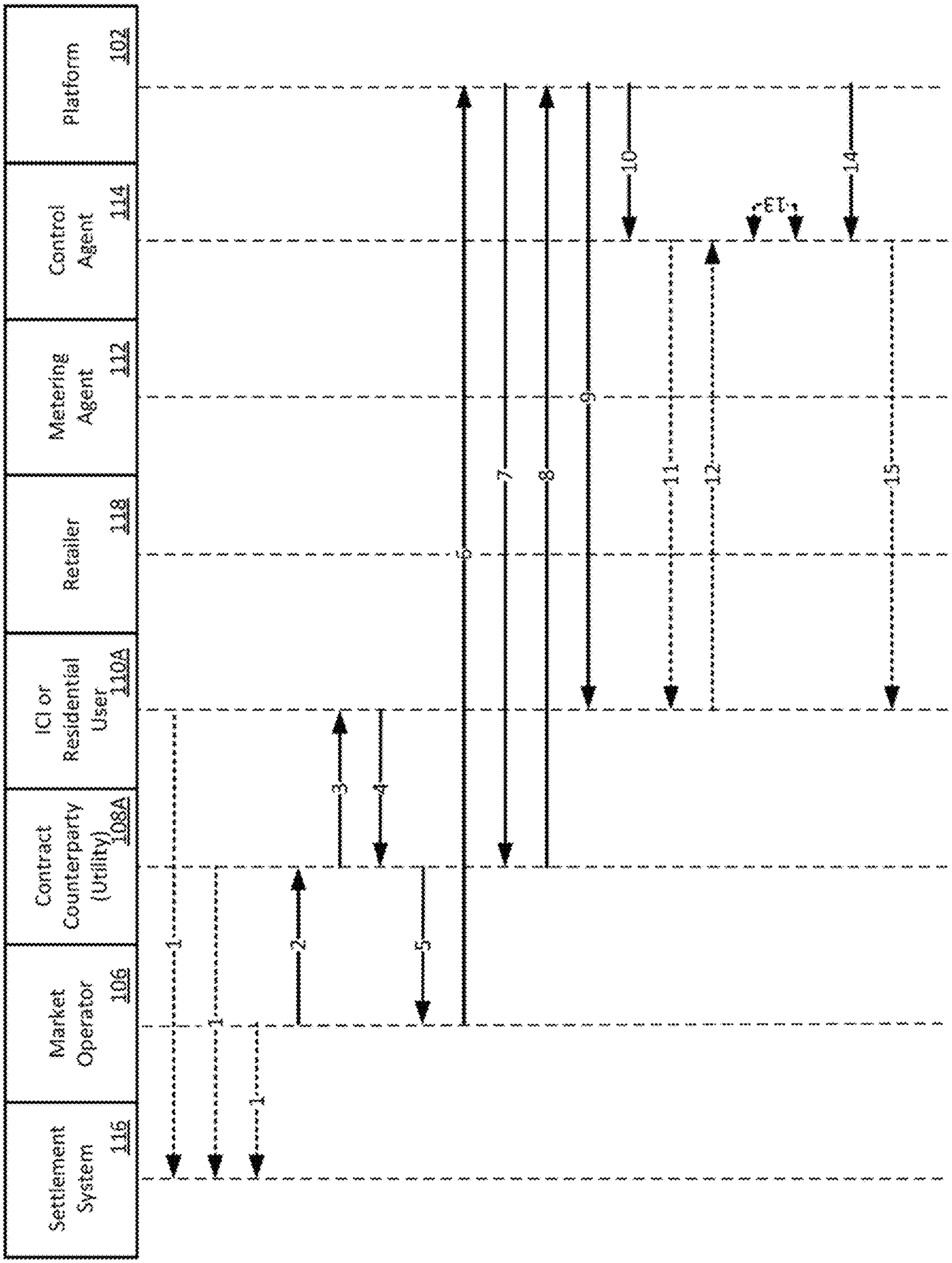
FIGS. 3A and 3B are flowcharts of operations consistent with teachings herein.
Figure 3B:
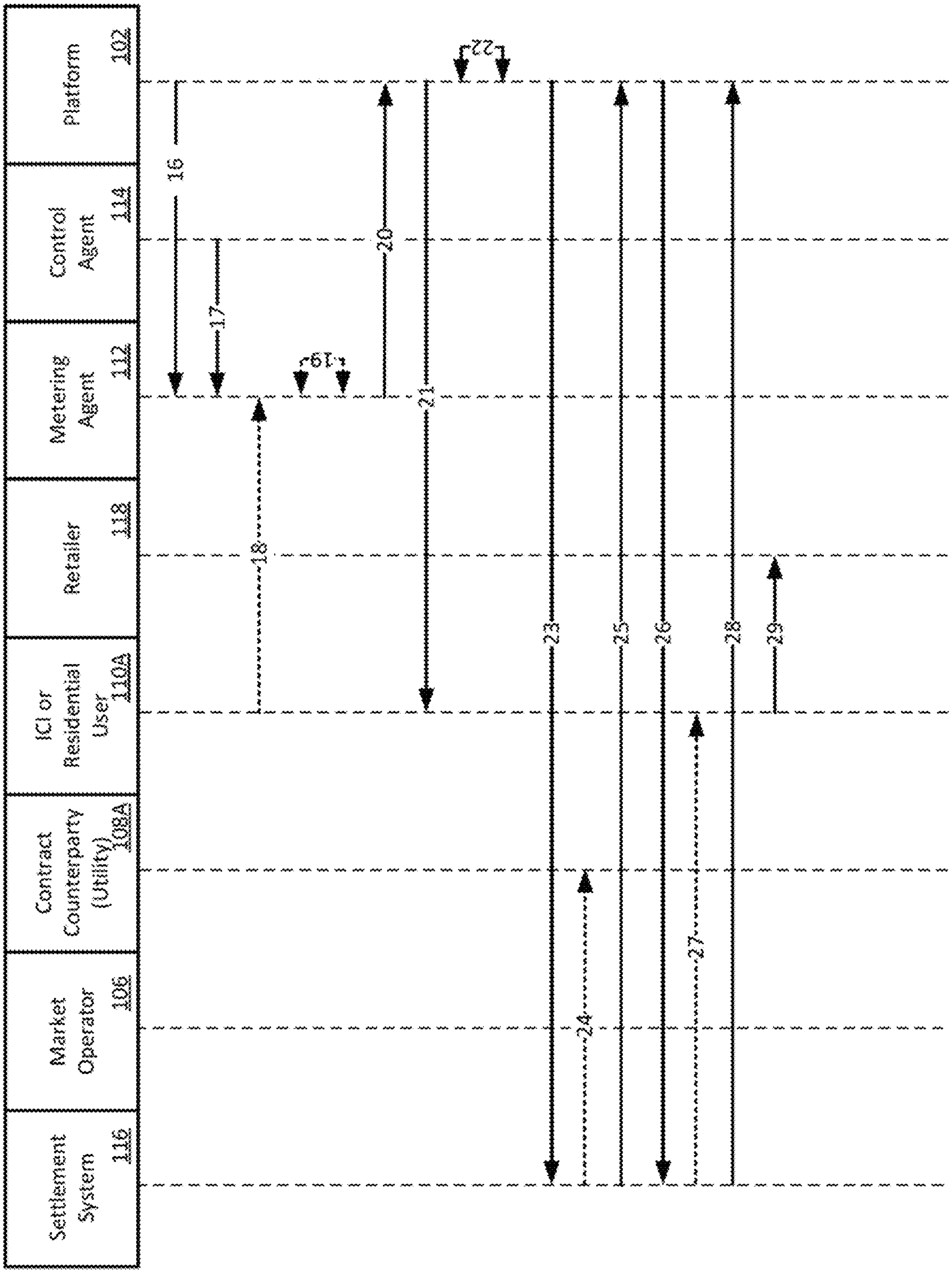

FIGS. 3A and 3B are a form of flowchart showing operations 300A and 300B for platform participants, including primary and secondary participants, in accordance with an embodiment. Operations 300 are as a result of respective operations of computing devices of FIG. 1. Numbered lines between entitles represent interactions or other activities. A numbered line starting and ending with a same entity represents an activity by the entity that may not interact with another entity.

Operations 300A and 300B are simplified. Certain operations are not shown such as registration and other setup related operations for each of participants: market operator 106, contract counterparty 108, ICI or residential user (e.g. customer) 110. In an embodiment, interfaces 208A-208D assist with such operations. Market operator 106 registers associations with respective contract counterparties (e.g. 108). Market operator registers for each market service they want to utilize. Different market services can be engaged in parallel—e.g. at a same time but respectively separate.

Each of the contract counterparties 108 registers an association with its customers 110 in their service territory. Each of the contract counterparties 108 registers for each market service they want to participate in. A contract counterparty (e.g. 108A) can register either as a target of requests from an associated market operator 106 or as a source of new requests.

Each of the ICI or residential users 110 downloads and installs contract counterparty-specific platform mobile applications (e.g. via a web interface of an application store or the platform (not shown)). A user of such an application configures their respective DER and other information for example, obtaining control agent 114 related information for the DER(s) of a respective user, authenticating as may be applicable to a control agent 114. Platform related components for example for residential users and control agents can test registered DER devices via the control agent for connectivity, and request and register devices for all applicable market services, for example. In an embodiment, a control agent component of the platform registers the residential user for applicable market services because the control agent is the one that knows the capabilities of the DER devices that the control agent can control, and what market services are possible to participate in, given the DER devices that the residential user has. Not all DER devices are applicable to all market services. For example, some DER devices may not satisfy requirements for GHG reduction market services. Only EV charging stations and associated batteries are applicable for EV Charging market services. In an embodiment, and as later described, when a contract counterparty, for example, invokes the platform to communicate a new quote for a contract related to a particular market service to respective customers for bidding, the quote is sent only to those customers with DER devices that can meet the requirements of the market service to which the quote relates. A customer with only a solar generator DER does not receive a quote for EV Charging.

At Line 1, a respective party signs up to the settlement system 116, such as to enable settlement via electronic payment.

At Line 2, market operator 106 initiates a quote—a request for a particular market service. The quote is communicated to respective contract counterparties who have registered their interest in receiving such quotes from the market operator. For example, via a dashboard type GUI of interface 208A, market operator 106 related data is presented and controls provided to receive input. It is understood that components of platform 102 such as middleware components facilitate interaction with the platform as well as communication of quotes and replies, etc. between market participants. Middleware components may comprise one or more message queues such as for communicating between various components of the platform (e.g. between a control agent component and a metering agent component or a control agent component and a contract counterparty component, or a contract counterparty component and a market operator component).

Market operator 106 can retrieve various market service and other platform statistics. The interface enables market operator 106 to: retrieve a list of outgoing quotes in the 'Draft' status; retrieve all outgoing quotes (with operational data) for display such as in a timeline chart; select a market service to display settings for that market service; register/unregister for the market service (e.g. by toggling the on/off switch for the market service). In an embodiment, market operator 106 can choose to be an initiator/requestor of the market service only (they do not have the option to choose to be a receiver e.g. a contract counterparty)). User interface 208A enables market operator 106 to: update configuration details for the market service (e.g. GHG heat rating threshold) and saves changes; create a new quote for a market service; saves the quote as draft before sending it out to contract counterparties 108; and submits the quote to associated contract counterparties who are also registered to participate in the type of market service specified in the quote. Drop down boxes or other interface elements can provide market operator-specific data to prepare a quote (e.g. market operator-specific network locations (as master data)).

Line 3 broadly represents operations by a contract counterpart initially dealing with the quote, and in particular, sending out an associated quote to its customers 110 registered to participate in quotes for the type of market service.

For example, via a dashboard type GUI of interface 208B for a particular contract counterparty (e.g. 108A), contract counterparty related data is presented and controls provided to receive input. The interface 208B enables contract counterparty 108A to: retrieve a list of available market services to populate a market service settings section of a navigation bar; retrieve incoming statistics (which are different than outgoing statistics); retrieve a list of incoming quotes in an 'Awaiting Response' status; retrieve all incoming quotes (with operational data) for display in a timeline chart; selects a market service to retrieve and display the settings for that market service; register/unregister for the market service such as by toggling the on/off switch for the market service; update configuration details for the market service (e.g. EV auto-scheduling window, or delayed response clearing criteria) and saves changes; among other actions.

In an example of operations at Line 3, contract counterparty 108A filters the 'Awaiting Response' table to find quotes for a particular market service only; opens an incoming quote from the 'Awaiting Response' table to display details of selected incoming quote; in response to an interest to bid to participate, creates associated outgoing quote for its customers; saves outgoing quote as draft; and submits the outgoing quote to customers. Outgoing quote information is written to the blockchain (e.g. shared data 204A. The platform is enabled to communicate the quote information to a particular contract counterparty's customers (via ICI and residential user related components) registered to receive quotes for the particular market service. For example, the platform receives a blockchain event that there is a new quote available and obtains the quote details. A list of associated customers who are registered to participate in the type of market service specified in the quote is obtained. Responsive to the respective control agent of a listed customer, the platform requests information (e.g. as a 'report') from the applicable control agent for any eligibility criteria associated with the market service for each customer. A final list of customers eligible for the market service opportunity is determined. Such intermediary information, in an embodiment, is stored to the platform in "off-chain storage" (not shown) so that customers can see this opportunity in their list of upcoming opportunities on their respective mobile apps. It is noted that, in an embodiment, "work in progress"-related information is stored off-chain and final results on chain.

The platform is enabled to send a (e.g. push) notification to each eligible customer that the new quote is awaiting response.

Line 4 broadly represents operations by a particular customer (e.g. 110A) of contract counterpart 108A which customer 110A is registered to participate in quotes for the type of market service. The customer may be a residential user or an ICI user. Broadly Line 4 represents operations to initially deal with a new quote, and in particular, sending a reply back.

For example, via a dashboard type GUI of interface 208C for a ICI customer or 208D for a residential customer 110A, customer related data is presented and controls provided to receive input. The user interface enables the customer to: receive a notification that there is a new quote available; retrieve a list of all quotes that are applicable for the customer; retrieve token balance; retrieve statistics about total payment; retrieve a list of transactions involving the customer to be able to indicate which opportunities the customer has a contractual obligation to perform; any retrieve a list of events involving the customer to be able to indicate which opportunities the customer actually performed; among other activities. An example GUI for a residential customer is shown in FIGS. 9A-9E and described further herein below.

In an example of operations at Line 4, the customer 110A selects the upcoming market service opportunity (new quote) that opens a detail window or other interface element (GUI) to be presented with full details of the quote.

In response to an interest to participate in the upcoming quote, the interface enables the customer 110A to reply with their interest—e.g. sending a tender to contract counterparty 108A. The platform records the tender submission on the blockchain.

Line 5 broadly represents operations by a contract counterpart 108A finally dealing with the quote, and in particular, sending out an associated bid/reply to the market operator 106. The platform, such as via a component for contract counterparties, receives a blockchain event indicating that a tender has been submitted for the quote. Details of the new tender are obtained (e.g. from the blockchain shared data 204A).

Platform 102 queries the blockchain to retrieve the latest quote information (e.g. with aggregated tender values). Platform 102 is enabled to update to the contract counterparty 108A dashboard including the updated quote, and the new tender details.

In an example of operations at Line 5 in relation to the particular contract counterparty 108A, the user interface 108B is used to present the outgoing quote details (e.g. via a tenders tab to view incoming tender information from customers). A list of incoming tenders associated with the quote is presented such as in a table or other interface element. Herein a tender is a reply to a quote from a requesting party. Customers of the contract counterparty 108A provide tenders to a quote from the contract counterparty 108A. The contract counterparty 108A provides a tender to a quote from the market operator 106.

In an embodiment, customer tenders are associated with a gate (e.g. a time to reply). Clearance operations wait for gate closure. At gate closure for an outgoing quote that is linked to an incoming quote from a market operator, customers are no longer able to respond to the quote but market clearing operations for these tenders do not immediately accept (or reject) tenders. Thus related contracts are not immediately created. Before customer contracts are established in response to the customer tenders, a tender made by the particular contract counterparty 108A to the (linked) incoming quote (from the market operator) needs acceptance by the market operator (i.e. by market clearing operations). If the tender made by the particular contract counterparty 108A is not accepted, the linked quote to the customers of the particular contract counterparty 108A is cancelled (e.g. the blockchain is updated with the cancellation) and no transactions (contracts) are created or contractual obligations established. The customers submitting tenders are notified and the tenders are cancelled (e.g. the blockchain is updated). Market clearance operations are performed via one or more smart contracts to automatically establish contracts between contract counterparties and their respective customers or a market operator and one or more contract counterparties. In a linked quote scenario, the smart contract(s) clear the head quote from the market operator to contract counterparties and then clear supporting quote(s) between contract counterparties and their respective customers.

Via a platform interface, a contract counterparty 108A can retrieve aggregated quote details for the associated outgoing quote. Contract counterparty 108A can prepare and submit a tender for the incoming quote to market operation 106 (or decide not to submit a tender (not shown)). The contract counterparty's tender includes price and quantity information, for example. In an embodiment, the contract counterparty has the ability to set a bid price in the tender, which price can compete with bid prices in other tenders from other contract counterparties.

Responsive to the contract counterparty 108A tender, among others, platform 102 provides an update to the market operator dashboard including the updated quote with the new status and new aggregated fields, including the preliminary clearing information (price/quantity) based on tenders received from various contract counterparties. The market operator (i.e. a market clearing smart contract) waits for gate closure related to the quote. A market clearing smart contract, on behalf of the market operator, accepts from among the received tenders (e.g. Line 6). Some received tenders may not be accepted. Accepted and rejected tenders can be notified to applicable contract counterparties and the blockchain updated (e.g. tender not accepted) (Line 7). In some instances, the quote is canceled (and the blockchain updated, etc. relative the quote, tenders submitted as well as linked quotes and tenders).

In an embodiment, a market clearing for a delivery quote results in the creation of one event per involved control agent, where each event groups together the DERs participating in the event (based on market clearing) that are controlled by that control agent. The event lists the grouped resources. This allows the control agent to deal with the controlled DERs as a group and update programs for all DERs in one shot instead of (necessarily) receiving and responding to individual event notifications. Blockchain transactions are established (e.g. via smart contracts and shared data) where there is one 'transaction' instance per cleared party (either contract counterparty or customer), but the event instructions for the actual control signal(s) are grouped into a much smaller number of events. In the simplest case where a single control agent operates all the cleared resources, this means: one Quote→many Tenders→many Transactions (one per cleared Tender)→one event.

Platform 102 is enabled to update the market operator user interface 208A (e.g. dashboard) including the updated quote with the new status and new aggregated fields based on the transactions created.

A contract counterparty component of the platform receives a blockchain event indicating that a transaction has been created for a particular contract counterparty 108A, obtaining from the blockchain the details of the new transaction. The platform retrieves the latest quote information (with updated status) for the incoming quote and determines if the incoming quote is linked to an outgoing quote. If yes, (e.g. at Line 8) the platform invokes the market clearing mechanism for the outgoing quote on the blockchain, updating the quote status and resulting in the creation of 'transactions' for all accepted/cleared tenders from customers, notifying as appropriate (Line 9). The control agent is notified at Line 10, such as previously described. Market clearance operations are further described below.

The platform is enabled to update to the contract counterparty dashboard including the updated quote, and the transaction details. Regarding contract counterparty customers having tenders related to the transaction, customer components of the platform are enabled to: receive a blockchain event that there is a new set of transactions available: obtain details of the new transaction, retrieve latest quote information (with updated status) for the quote associated with the transaction and communicate update(s) to the customer mobile/web app including the updated quote, and the transaction details.

Regarding control agents associated with customers having transactions for the quote, control agent components of the platform are enabled to (e.g. at Lines 10 and 11): receive a blockchain event that there is a new set of transactions available; obtain the details of the new transactions; communicate control signals (e.g. via control agent device 114) to a set up program on the DERS, (e.g. via an invocation of the control agent's proprietary APIs). The start of the program is waited upon. That is, the transaction may relate to an obligation to provide an amount of electricity starting at a first certain time and ending at a second certain time.

The control agent component can interpret the contract terms (the transaction) and sets a timer in the platform or receives an invocation/internal platform notification indicating that a customer's program has started. In an example, as transactions are received at the platform for various quotes, the control agent component can determine if there is a timer that was already created for that start date/time, and if so, can add the new customer to the set of customers that need to be reported on at that time.

In response to the happening of the first certain time, for example, the control agent component records on the blockchain that the transaction/event has started.

At Line 12, the control agent component of the platform receives from the control agent new operational data regarding DERS under its control. Updates can have relatively high frequency of reporting (e.g. every 12 seconds). A low-level capture of progress data enables making real-time operational data available per customer 110 and enables a basis for operational reporting. Such operation data is provided to respective customer interfaces for presentation (e.g. 208D for a particular residential customer). A contract counterparty can have access to operational data for its own customers. A market operator can have access to operational data for its contract counterparties. Publish/subscribe type message queues (e.g. with "topics") can be utilized—one set for communicating between control agents to contract counterparties, and one for contract counterparty to market operator.

In an embodiment, for example at Line 13, operational data from a control agent need not be stored on chain because it's not actually used for determining whether obligations were met/payment should be made. Such activities are responsive to information from the metering agent and is based on a separate report request being made from the metering agent to the control agent Operational data can be use by a contract counterparty component to display operational data per customer tender. Such data, can be rolled up for the performance against the quote overall.

Aggregated data for the contract counterparty's (outgoing) quote is used to contribute to the performance of the contract counterparty's tender for the market operator's quote and shown on the market operator dashboard. The aggregated operational data from each contract counterparty tender is aggregated again to determine the performance of the market operator quote against its targets. A control agent component of the platform collects the performance information from internal data sources and extracts the information that is relevant for the provision of the market service. Because this information is per customer and per market service, it is expected that the amount of data in each message is small, likely consisting of just the individual meter readings/values that describe the performance observed over the previous time period. In an embodiment, the control agent component is enabled to retrieve the contract counterparty associated with the customer for the given market service, publish ('updates') the report with new data per customer placing the data on a "topic" that is specific to the contract counterparty.

The customer component of the platform is enabled to: receive the message off the contract counterparty-specific topic with messages for all customers; store the actual data reading received in off-chain storage associated with the transaction/event ID so that it can be later retrieved to see the historical performance of this transaction/event; communicate to a particular customer mobile/web app real-time performance contribution data for the particular customer.

The contract counterparty component of the platform is enabled to: receive the message off the contract counterparty-specific topic with messages for all of its customers; communicate to the contract counterparty dashboard with the performance details for each customer tender. Graphical representations can be provided such as per customer tender.

The contract counterparty component is enabled to: use logic responsive to the type of market service to aggregate the data from the underlying customers into rolled-up values for the contract counterparty at a quote level; store the aggregated data reading across all its customers in off-chain storage associated with the Quote ID so that it can be later retrieved to see the historical performance of this contract counterparty Quote; update the contract counterparty dashboard with the aggregated performance details for the contract counterparty quote; and published aggregated data on a topic that is specific to the contract counterparty so that it can be consumed by the market operator.

The market operator component of the platform is enabled to: receive the message off the contract counterparty market operator specific topic; and communicate an update to the market operator dashboard with the performance details for each contract counterparty tender;

The market operator component can utilize logic responsive to the type of market service to aggregate the data from the underlying contract counterparties into rolled-up values for the market operator.

The market operator component of the platform is enabled to: store the aggregated data reading across all contract counterparties in off-chain storage associated with the market operator-outgoing Quote ID so that it can be later retrieved to see the historical performance of this market operator Quote; and communicate to the market operator dashboard aggregated performance details for the market operator quote.

At a second certain time, DERs operations end. At Line 14, the control agent component of platform 102 is enabled to: set a timer in the platform or receives a notification indicating that the DER program has ended for a given customer; collects any remaining performance information (e.g. from internal data sources) and extract information that is relevant for the provision of the market service; and publishes ('updates') with new data per customer ID placing the data on a topic that is specific to the contract counterparty. The control agent component records on the blockchain that the transaction/event has completed.

Lines 14 and 15 represents control signals to terminate the DER program at the second certain time. However, such a control signal can be combined with similar signals regarding initiating the program at the first certain time (e.g. at Lines 10 and 11).

With reference to Lines 16 and 17 and operations of a metering agent component of the platform and metering agent device 114, the metering agent component is enabled to: receive multiple blockchain events, each indicating that a particular transaction has completed and is ready for verification; retrieve the transaction details from the blockchain to understand the obligations on the customer for performance of the contract; query the blockchain to retrieve the control agent associated with the given customer identified by the event; and request transaction/event performance data for each customer from the control agent component. Such performance data can be requested as a 'report' by placing a message on a control agent queue, indicating the time window for which report data is requested.

The control agent component is enabled to reply to the request for per customer performance data, for example, prepare respective reports, one per customer and using the messaging queue. In an embodiment, each customer request will result in a separate customer response into a messaging queue specific to the metering agent.

The metering agent component is enabled to: receive the customer-specific responses from the control agent response queue. Each response includes the data collected by the control agent for a given customer that is needed by the metering agent to validate participation according to the terms of the transaction.

The metering agent component is enabled to gather additional data from internal and/or external data sources as needed to perform the validation activities. The metering agent component can receive data from metering agent device 112 for DER meters (e.g. Line 18) and other external sources (not shown) such as weather service verifying whether sun or wind was or was not available (e.g. Line 19). Metering agent operations can evaluate the participation related data, environmental data etc. and determine participation. In an embodiment, metering agent performs fraud and/or reporting accuracy analysis for example, evaluating details of metering data; location, time and/or environmental data; specifications of the DER device; etc. and determine whether the amount of energy purportedly supplied, under the contract is correct.

The metering agent component is enabled to write a validation response to the blockchain to indicate that the obligations defined in the transaction (for a specific ICI or RU customer) were completed successfully. Validation is useful to perform settlement, etc.

The platform (e.g. platform operator component) is enabled to: receives a blockchain event that indicates that a transaction obligation for a specific customer was successfully completed (e.g. Line 20); gather transaction information from the blockchain to understand performance and mint and transfer tokens to respective customers according to validated performance (e.g. Line 21); aggregate and provide aggregated performance data from customers to certify higher obligations (e.g. of a contracting counterparty) (e.g. Line 22).

Settlement operations relate to paying each of customers and contracting counterparties in accordance with the respective transactions for the respective quotes and per validated performance. Lines 23, 24 and 25 relate to settling payments between the market operator and one or more respective contracting counterparties. Completion of settlement is recorded to the blockchain (Line 25) (e.g. by the platform operator component on advice of the settlement system).

Lines 26, 27 and 28 relate to settling payments between the contracting counterparties and their respective customers. Completion of settlement is recorded to the blockchain (Line 28) (e.g. by the platform operator component on advice of the settlement system).

In an example, the platform operator component is enabled to: gather transaction information from blockchain to understand the parties (e.g. payor and payee) involved in the transaction; retrieve payment registration information for the parties; invoke a settlement via a settlement API to move money from payor to payee account; write a transaction confirmation number to the blockchain to record that the payment to a particular payee has been processed; and record a status of the payment as in-progress. The status can be updated in response to confirmation of completion for the given transaction number.

The customer component of the platform, such as for a residential user, is enabled to: receive a blockchain notification that a payment status has been updated; retrieve the payment transaction (with the newly updated status), for example, based on the payment identifier in the event payload; communicate to the customer mobile app/web app for the specific customer an update to the payment status and the transaction status. Payment status can be recorded to the blockchain.

The customer component of the platform is enabled to: retrieve a token balance and payment history aggregation (in terms of total money paid); and communicate to the web/mobile app with the updated balance information (e.g. for the display of total amount earned, etc.)

The contract counterparty component is enabled to: receive a blockchain notification that a payment status has been updated; retrieve payment transaction information (with the newly updated status), for example, based on the payment identifier in the event payload; retrieve quote information (with the newly updated payment status), for example, based on the transaction identifier in the event payload; and communicate to the contract counterparty dashboard an update to a payment table, and any quote listings that show the payment status (i.e. when the quote is in 'completed' state).

The market operator component is enabled to: receive a blockchain notification that a payment status has been updated; retrieve payment transaction information (with the newly updated status), for example, based on the payment identifier in the event payload; retrieve quote information (with the newly updated payment status), for example, based on the transaction identifier in the event payload and communicate to the market operator dashboard to update a payment table, and any quote listings that show the payment status (i.e. when the quote is in 'completed' state).

In an embodiment as noted, customers, particularly residential customer, earn tokens for participating in contracts. The tokens can be responsive to the activity undertaken (e.g. responsive to the market service) such as for GHG emission reduction, and/or other green energy behaviour. In an embodiment, the tokens are rewards useful to obtain a benefit such as a product or service from a retailer. The benefit may be a price reduction, enhancement, exclusive offer, etc. Line 29 broadly relates to a customer spending a token or more than one token with a retailer. Each retailer has a token account on the blockchain. In an embodiment as noted, the user's mobile application, for example, is enabled with a wallet function to store and transact tokens. The wallet has applicable keys to write transactions to the blockchain, as is known. The wallet function enables a user to spend a token(s), writing a corresponding blockchain transaction that transfers an amount of tokens to the retailer's account such as in accordance with the protocols of the blockchain provided by the platform. The wallet transmits the transactions via middleware to the platform.

Though not shown, the platform provides retailers with an interface to establish keys and related token accounts and to transact tokens.

It will be apparent to a person of skill in the art that the platform enables chaining of transactions, for example, establishing contracts between a market operator and respective contract counterparty for a type of market service, which is chained with contracts between the respective contract counterparty and their respective customers. The platform has logic (e.g. including smart contracts) to establish the contracts, which logic is responsive to the chaining. For example, contracts between a respective contract counterparty and its customers based on tenders submitted and accepted, are not established until the market operator establishes its contract with particular contract counterparties. Clearance and reporting of operational data is responsive to chaining as well. While only two contract chain links are described, additional links could be provided, accounting for additional providers between a DER owner and a market operator (e.g. a DER aggregator (not shown) that offers DER services to a contract counterparty).

User Credibility

As noted previously herein, a contract counterparty commits to obligations regarding energy distribution and in turn can impose related obligations on others, including residential users or other owners of DERs. If the related obligations are not met, this event can impact the contract counterparty's ability to meet its obligations, often with financial consequences. DER owners may not fully understand the implications of not meeting commitments to perform contracted services in terms of their potential effects on the stability of the energy grid as a whole. In an attempt to motivate DER owners to actually perform the services they have signed up for, platform 102, in an embodiment, utilizes a credibility rating. In an embodiment, the credibility rating applies to DER owners who are residential users of platform 102. The description herein relates to residential users and is applicable to other types of DER owners who are users of the platform, with any necessary modifications, as would be understood to a person of ordinary skill in the art.

A purpose of credibility within the platform includes any one or more of: 1) encouraging regular participation in available market services; 2) discouraging cancellation of participation in market services a residential user has previously committed to deliver; or 3) enabling contract counterparties to express and differentiate the importance of credibility on a per-market-service-instance basis. For example, due to the potential negative side effects that could result should a DR market service not be adequately satisfied, such a market service event may be rated with a higher credibility importance than a GHG-reducing market service event in which everyone is invited to participate.

Credibility is one example of a manner to encourage behaviour and continued participation within the platform. Monetary rewards for the provision of market services as well as rewards such as tokens exchangeable for goods and services with participating retailers are also earned upon the successful completion of market services. But credibility can be distinguished from payments of money or rewards in that credibility is designed to encourage consistent participation vs. encouraging participation only when the monetary and reward-related benefits are sufficiently high.

Credibility can be set for a quote for a market service, such as by a contract counterparty, by introducing a new attribute named 'Credibility Weighting' within a "terms" section of the Quote Details page on the contract counterparty dashboard for new outgoing quotes. See FIG. 5 described below herein.

For simplicity of user experience, the options available to select can be limited to a predefined number of weightings, such as three, for example: NORMAL; HIGH; and CRITICAL. Other terms or symbols could be used (e.g. low, medium, high; green, yellow, red; 1, 2, 3; or *, *, *** weightings).

In an embodiment, contract counterparties are enabled to adjust the credibility weighting on a per-market-service-instance basis—with each quote to be sent to residential users. Thus a particular DR market service scheduled for the hottest summer day can carry a higher importance of Credibility than a DR event on a mild day in October, which can be further differentiated from a market service requesting managed EV charging for the month of November. The importance of credibility can be set for each of these market service instances independently.

The following paragraphs describes a manner to compute credibility such as for a residential end user, in accordance with an embodiment.

Possible outcomes of a residential end user's participation in a given market service quote are shown in Table 1 along with the impact of that outcome on the user's credibility score:

TABLE 1

| Outcome | Score Impact |
|---|---|
| 1) Opt out (i.e. no tender submitted)<br>neutral impact | 0 |
| 2) Opt in, but tender not accepted (i.e. tender not cleared)<br>positive impact | +1 |

TABLE 1-continued

| Outcome | Score Impact |
|---|---|
| 3) Opt in, tender accepted, service obligations met positive impact | +1 |
| 4) Opt in, tender accepted, service obligations not met negative impact | −1 |
| 5) Opt in, tender accepted, but participation cancelled negative impact | −1 |

A numeric value for credibility can be computed for a given residential user by evaluating the outcomes of the user's participation whereby the impact of a given outcome on the residential user's overall credibility score (negative, neutral, positive) is weighted by the credibility importance assigned to that quote (NORMAL, HIGH, CRITICAL). For example, a weighting factor is applied to a residential user's participation score impact. The weighting factor is responsive to the weighting applied to the quote. For example, Table 2 shows weighting factors for three quote weightings previously described.

TABLE 2

| Weighting | Weighting Factor |
|---|---|
| NORMAL (N) | 1 |
| HIGH (H) | 2 |
| CRITICAL (C) | 3 |

A numeric value for credibility can be determined in response to a user's participation in a set of most recent quotes. In an embodiment, the set of most recent quotes is the determined simply by a count of the quotes e.g. the most recent 9 quotes. In another example, the set of most recent quotes is determined by setting a threshold for the total available weighted score—the set is the most recent quotes where the total available weighted score for the set is at least X in value e.g. 15. In an example, a combination of quote count and total available weight score is used e.g. minimum X quotes with total score having a minimum of Y. In an embodiment, the customer has one credibility score for use with all types of market services having credibility weighting. Separate scores can be determined and used, such as one score for each type of market service.

Table 3 shows credibility score related values for 9 most recent quotes and for a particular user. The table shows each quote's weighting (N, H or C), the particular user's outcome (1 to 5), the credibility score impact (−1 to 1) and a weighted score value (−3 to +3) after a weighting factor (1 to 3) is applied.

TABLE 3

| Associated Quote ID | Q17 | Q18 | Q23 | Q24 | Q27 | Q28 | Q29 | Q33 | Q34 |
|---|---|---|---|---|---|---|---|---|---|
| Quote Credibility Importance | N | N | H | N | N | H | C | H | H |
| Outcome | 1 | 3 | 3 | 4 | 1 | 5 | 3 | 2 | 1 |
| Credibility impact | 0 | +1 | +1 | −1 | 0 | −1 | +1 | +1 | 0 |
| Weighted Score | 0 | +1 | +2 | −1 | 0 | −2 | +3 | +2 | 0 |

It will be apparent that the total available weighted score (e.g. a perfect score) for these 9 quotes is 15 and the user's total weighted score is 5. Based on the above participation log, the residential user's credibility score would be computed as:

(User's Total Weighted Score/Total Available Weighted Score)*100%=(5/15)*100%=33.33%.

In an embodiment, specific details of the credibility scoring algorithm need not (and in fact, should not) be disclosed to the user to shield them from confusion. Instead, for ease of understanding and simplicity of the user experience, the credibility score can be plotted against a set of thresholds/tiers instead of displaying the credibility score numerically to residential end users such a shown in Table 4, in accordance with an embodiment.

TABLE 4

| % Range | Credibility Rating |
|---|---|
| 0-20 | Poor |
| 20-40 | Fair |
| 40-65 | Good |
| 65-95 | Great |
| 90-100 | Trusted |

Thus, a user with the above quote participation history and resulting credibility score of 33.33% would have a "fair" credibility rating.

In accordance with the computing of the credibility score as described, the importance of a given quote has a weighted impact on the user's credibility score. For the purposes of gamification, users can accurately be ranked against one another in absolute terms or within a given credibility tier due to the normalized nature of the credibility score. Because the total available weighted score is (only) 15 and allocated to the most recent quotes first, as the user participates in more quotes older entries fall out of consideration. This has the effect that the user is not penalized in perpetuity for past unreliable behaviour.

Quotes that are not made available to a given user have no impact on that user's credibility score. In the example above, quotes Q19, Q20, Q21, Q22, etc. were not presented to the user, and thus there are available score values allocated to those quotes. The user's credibility score is only affected by elements that are within the user's control.

New users can have their slots initialized with values that will not prejudice them from having their tenders accepted in future quotes. For example, new users could be configured with a "good" credibility score when they first join the platform.

The potential credibility impact of not participating in a given quote (or opting out of a quote previously committed to) in terms of its effect on a particular user's credibility score can be accurately communicated to the particular user in advance to help with decision making and to encourage credibility. It is noted that the actual impact on credibility rank cannot be guaranteed, given that the rank is also dependent on the choices of other participants. As described further, should other users with higher credibility scores choose to participate in a quote with a HIGH or CRITICAL importance weight, the tenders from such users could be selected and the tender of the particular user with the lower score not be selected.

Visualizing Credibility to Residential Users

In accordance with an embodiment, a simple mechanism for visualizing the residential user's credibility tier and progress towards advancing to the next tier is incorporated into the user interface for residential users (e.g. in a user's mobile application or web-based application). An activity-progress-indicator, represented graphically, is presented. The graphical element is presented in a top section of the home screen in an embodiment. See FIGS. 9A-9G described below herein. The graphic element is associated with a control that when invoked, expands the content to show the progression of credibility over time (e.g. FIG. 9D). Importantly, the different tiers can be shown on the expanded chart to encourage the user to climb to higher levels of credibility with continued participation. For a given market service request, the importance of credibility can be communicated, as can the credibility implications of successfully completing the event.

Market Clearance

As previously noted, in accordance with an embodiment, market clearance operations are performed automatically by platform 102 such as by smart contracts, though a person of skill in the art will understand that rules, policies or other mechanisms can be used. For example, for reasons of transparency, fairness and/or good faith, tenders are accepted according to established objective criteria. Criteria can include, but are not limited to: price, quantity, location, tender date/time, customer credibility, whether participating in another market service contract in the same period, quantity of participation (participation rate for the DER device (e.g. N %)) and DER type.

Tenders can be ordered/ranked based on the defined criteria and accepted according to such rank until a sufficient quote-related metric is satisfied. The quote-related metric can comprise a quantity of energy, a reduction in (e.g. tonnes) of CO 2 produced, etc. The quote-related metric is often related to the type of market service associated with the quote. A tender date/time can be used to order tenders with a same rank (determined from other criteria) such as to prefer those tenders received first in order. For transparency, market clearing operations can be formulated as rules or policies, and/or smart contracts made available to participants in the platform. Quote preparing interfaces can have associated fields with controls, for example, to indicate criteria for tender selection. The criteria (information) can then be included in the quotes as sent to quote bidders or the quote bidders can be directed on how to obtain such information. For example, if a particular DER type is selected by a quote initiator as being preferred or less preferred, such information is made available to a quote bidder.

To diversify tenders accepted such as with a view to minimizing risk that a customer will not meet obligations, market clearance operations may use a quantity of participation—e.g. how much of the owner's DER is committed to the contract. A smaller amount can be preferred. Similarly, whether the customer is participating in a contract having a same delivery time period can be used, spreading the risk by having contracts with more customers rather than more than one contract with a same customer. DER type can be preferred, for example, for a quote for a particular market service. DER types can be ranked by type or performance metrics. In a GHG reduction quote, solar or wind DERs can be preferred over biomass DERs, as an example, with a view to producing higher GHG reductions.

In accordance with an embodiment, a user's credibility score impacts the user's participation in new quotes. By adjusting the credibility weighting to a value above "NORMAL", the contract counterparty is indicating that tenders from residential users with a higher credibility rating should be given precedence over those with lower credibility ratings. This can be done by configuring quote clearing operations to take credibility into account. When the credibility rating is marked as "HIGH" or "CRITICAL", incoming tenders are sorted in descending order of their credibility score during market clearing such that tenders from residential users with the highest level of credibility are selected first until a sufficient quantity has been procured. In an embodiment, both "HIGH" and "CRITICAL" credibility importance levels are handled identically as it relates to market clearing for the market services available, for example, when there is no variation in price between residential tenders for the supported market services. Otherwise, in accordance with an embodiment, the credibility importance level is used as a criteria in a weighting function that prioritizes credibility scores, for example, over price in the incoming tenders. Even in an equal treatment scenario with this similarity in the handling of HIGH and CRITICAL credibility importance levels, scores/range ratings can still successfully be used to communicate the relative importance of credibility to users and encourage the desired behaviour as such scores will still have different impacts on the ability of users to increase their credibility scores and achieve new levels.

Rewards

As noted elsewhere herein, verified participation where performance under a contract is verified by a metering agent, triggers minting and allocation of rewards to customers. In an embodiment, the rewards are represented as tokens in the blockchain. In an example, responsive to the verified participation, a smart contract mints tokens and assigns tokens to the customer in proportion to the customer's participation in a completed contract. In an example, tokens can be spent (e.g. transferred from a customer account to another account (by way of smart contract)) such as for purchases from merchants. In an example, tokens are proportional to payment under the contract, thought other criteria can be used alone or in combination.

In an example, different token types are generated for each of the market services (e.g. EV Charging Tokens, GHG Reduction Tokens and DR Tokens). It will be understood that tokens can be generated based on various criteria. In an example, tokens can be generated based on one or more different measures, particularly, different relevant measures of energy consumption or generation. One relevant measure includes a reduction of GHG (e.g. usually stated as g CO 2 even though other gases are included).

Platform 102 can include functions, tables or other capabilities to determine one or more tokens based upon the customer's verified participation. For example, a customer may receive GHG reduction tokens for spending with a merchant and a second type of token representing an energy credit or other measure showing compliance with a regulatory program requirement, or certification program, etc. Such requirements/programs may be location dependent, enrolment dependent, etc. and tokens issued accordingly. Customers may be required to provide or prove their eligibility for such second type of tokens. Such tokens may be transferrable, expire or otherwise be treatable such as in accordance with rules or requirements of the associated regulator or certificate provider.

Platform 102 can be configured to provide an interface to look up token data. Another platform user (e.g. a regulator or certificate provider) can be enabled to verify how many tokens of a specific type a customer has. Access can be permissioned for example such that only verified users can perform the look up and may be restricted to only certain types of tokens or certain token data. Token data can indicate token quantity in hand or received as of a certain date or received within a certain time period, for example. A look up may answer the question "How many grams of CO 2 reduction did customer X achieve between Jan. 1, 2022 and Jun. 30, 2022?"

It will be noted then that tokens may have value on external markets, as they are a verifiable, immutable representation of a particular behaviour having been performed (e.g. as per the market service participation for which the token was generated). If that token represents the generation of green energy, the characteristics of the behaviour backed by the token may be sufficient to justify the creation of a Renewable Energy Certificate that can then be traded on external markets. However, it is not necessary that the token be valuable on external markets, as the offer of good/services by merchants in exchange for tokens may be justified simply on the marketing and brand value thus afforded.

User Interface Examples

FIGS. 4, 5, 6, 7, 8, 9A to 9E, 10A, 10B, 11, 12A and 12B are screenshots of user interfaces for presentation by respective computer devices in accordance with embodiments herein.

Figure 4:
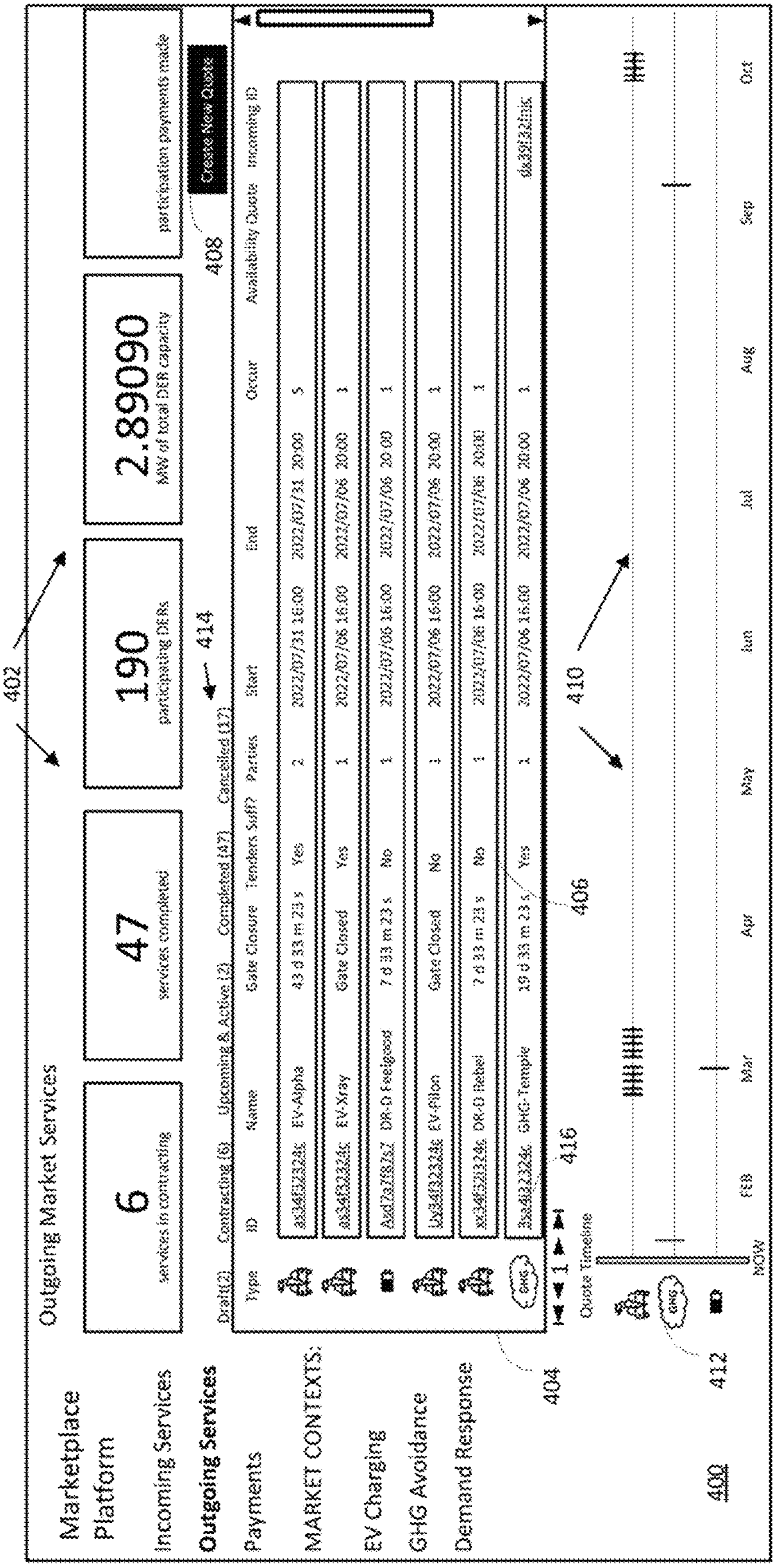
FIGS. 4, 5, 6, 7, 8, 9A to 9G, 10A, 10B, 11, 12A and 12B are screen shots of example user interfaces in accordance with the teachings herein.

FIG. 4 shows a dashboard GUI 400 for a contract counterparty device (e.g. 108A), which can act as a home page such as for a web-based application/web-based interface to services of platform 102. Dashboard 400 can be displayed after a login interface (not shown), which can be configured for two factor authentication. High level statistics 402 for outgoing market services are available on the home page showing the amount of DERs under management, total payments made, etc. A table region 404 of the interface shows individual quotes (e.g. 406) in various quote states (i.e. Contracting, Upcoming and Active, Completed, Cancelled). To create a new quote, a user can click on a "Create New Quote" control 408. A timeline graphic control 410 visualized contracts by respective contract date on a timeline, where each market context (responsive to the market service to which the contract relates) is illustrated on separate timelines. Market services/context are representable by icons (e.g. 412).

Figure 5:
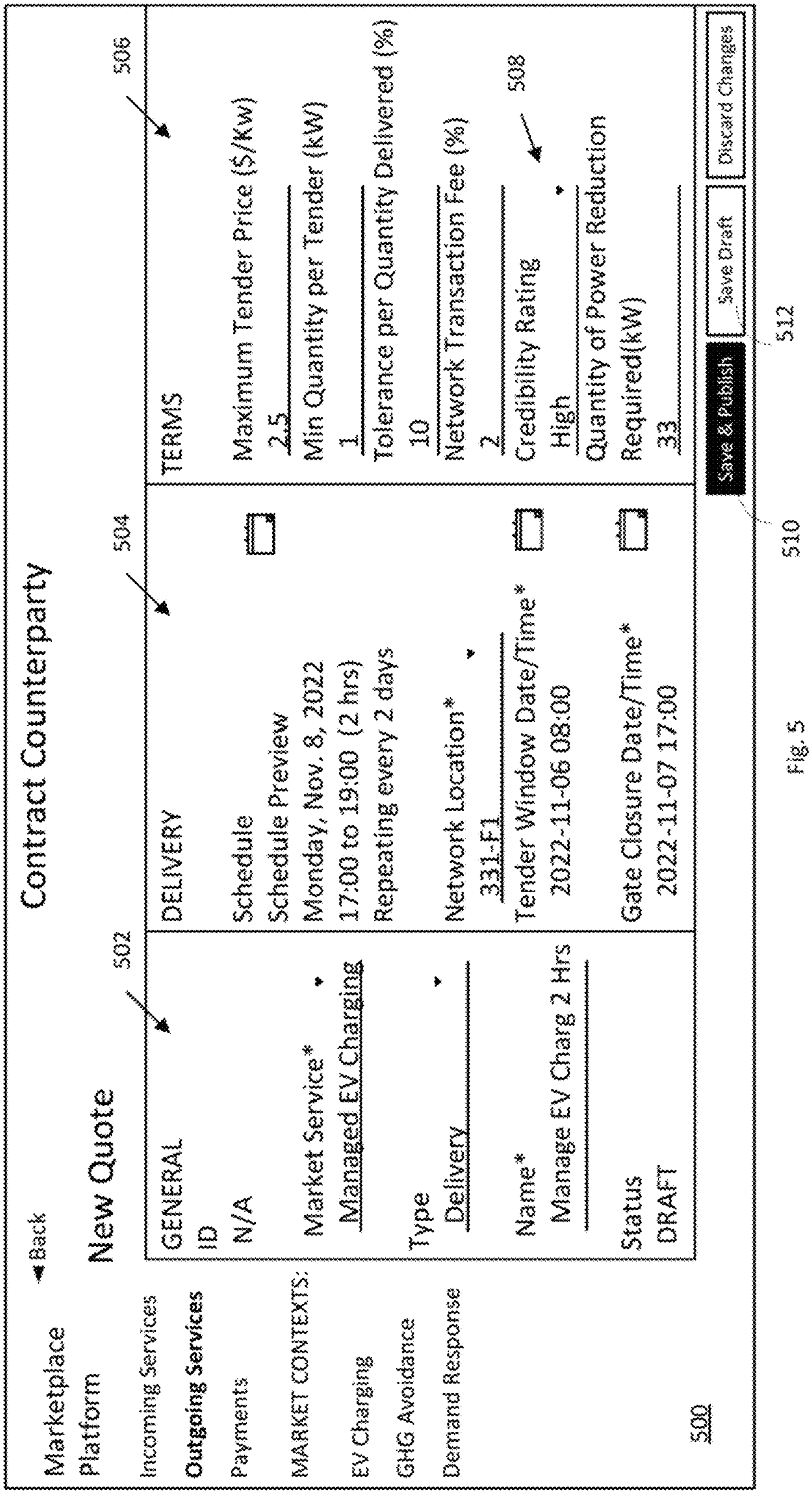

FIG. 5 is a new quote interface 500 with which to define a new quote. New quote interface 500 is invoked, for example, via control 408. New quote interface 500 is useful to define a new quote for publishing to customers of the contract counterparty, for example, to assist with fulfilling a market operator's quote by the contract counterparty.

New quote interface 500 has a plurality of fields and related controls to receive user input. Drop down menu selection is configured to select between predefined data options for respective fields, where applicable. Fields with an * are mandatory input fields according to the embodiment. For example, at region 502, the interface enables a user to select the market service and type from the drop-down menu and input a contract name; and at regions 504, and 506 the user is enabled to input the delivery and terms details.

A credibility weighting 508 is applied to customer tender selection operations as described further herein. As the contact counterparty is responsible to deliver upon the obligations of respective contracts it enters (e.g. for example, with a market operator), the contact counterparty wants to minimize its risk and ensure that energy is provided, when needed, or demand is lessened, when needed, per the respective terms of respective contracts. Each contact counterparty customer is evaluated based upon the respective customer's past performance with respect to meeting the terms of the contracts the customer agrees to perform. Each contact counterparty customer is assigned a respective credibility score. A customer credibility score assists the contact counterparty to select among available tenders from its customers.

When completed, the contract can be saved and published via clicking a 'Save & Publish' control 510, or the user can choose to 'Save Draft' (via control 512) and publish later.

With reference again to FIG. 4, Tabs 414 filter quotes for presentation in table 404 by quote state. Selecting a contracting tab filters all quotes to present only the quotes the contracting state (e.g. still accepting tenders before the gate closes). From table 404, a user can review the quote details by finding the quote of interest and clicking on the Quote ID (e.g. 416). In an embodiment, a quote details interface (not shown) presents general information such as quote id, quote name, market service, type, link to an incoming quote (e.g. from a market operator), as well as delivery and terms. A "cancel quote" control is provided to cancel a quote such as described. Tabs for the quote details interface (e.g. details, tenders, transactions, execution and performance tabs) enable a user to view associated information for the quote. The quote details interface can be invoked for quotes in various quote states. A quote in a draft state, cancelled state or contracting state will not have transactions, execution or performance information but a quote in an upcoming & active or completed state has at least some of this information. Quotes in an upcoming & active states are those where the quote's gate closed, with tenders received and at least some accepted, as described.

Figure 6:
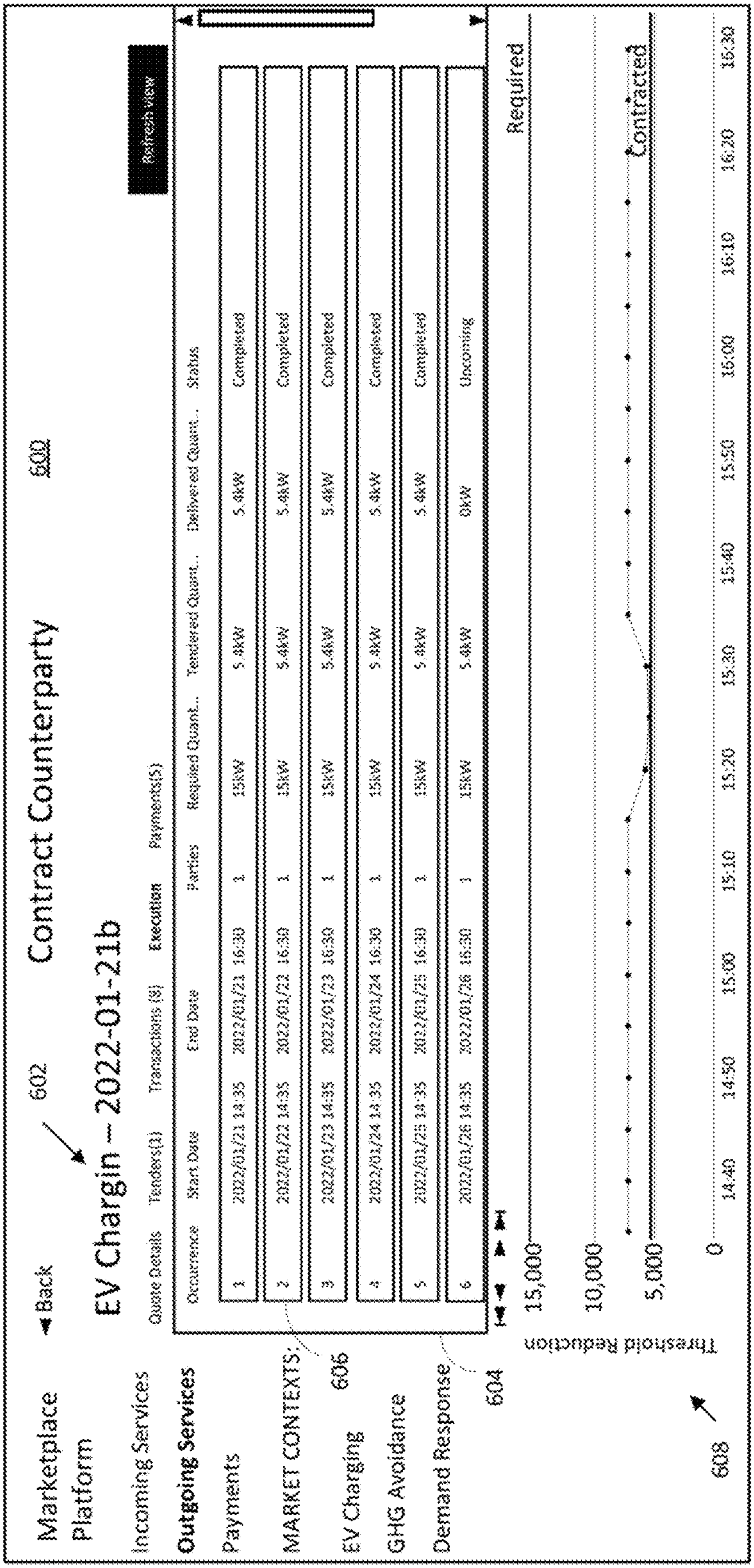

FIG. 6 is a screenshot of a quote details "execution tab" interface 600 for a quote in the upcoming & active state. The quote represented is a Managed EV Charging quote 602. A table 604 shows a series of events (e.g. 606) for the quote as the quote spans multiple days (i.e. Monday, Tuesday, Wednesday). That is, the quote has multiple occurrences. Once an event in the series has started, the interface enables a user to click on the 'Execution' tab to view the individual contributions associated with the event as well as a graph 608 that shows the real-time participation data associated with the event. Though not shown, a "transaction tab" interface, according to an embodiment, shows the individual transactions (e.g. in a table by customer) associated with each end-user (customer) that participated in each completed event in the series, including verification information. Though not shown, a "payments tab" interface, according to an embodiment, similarly shows the individual payments made and payment status (e.g. in a table by customer) associated with each end-user (customer) that participated in each completed event in the series.

Figure 7:
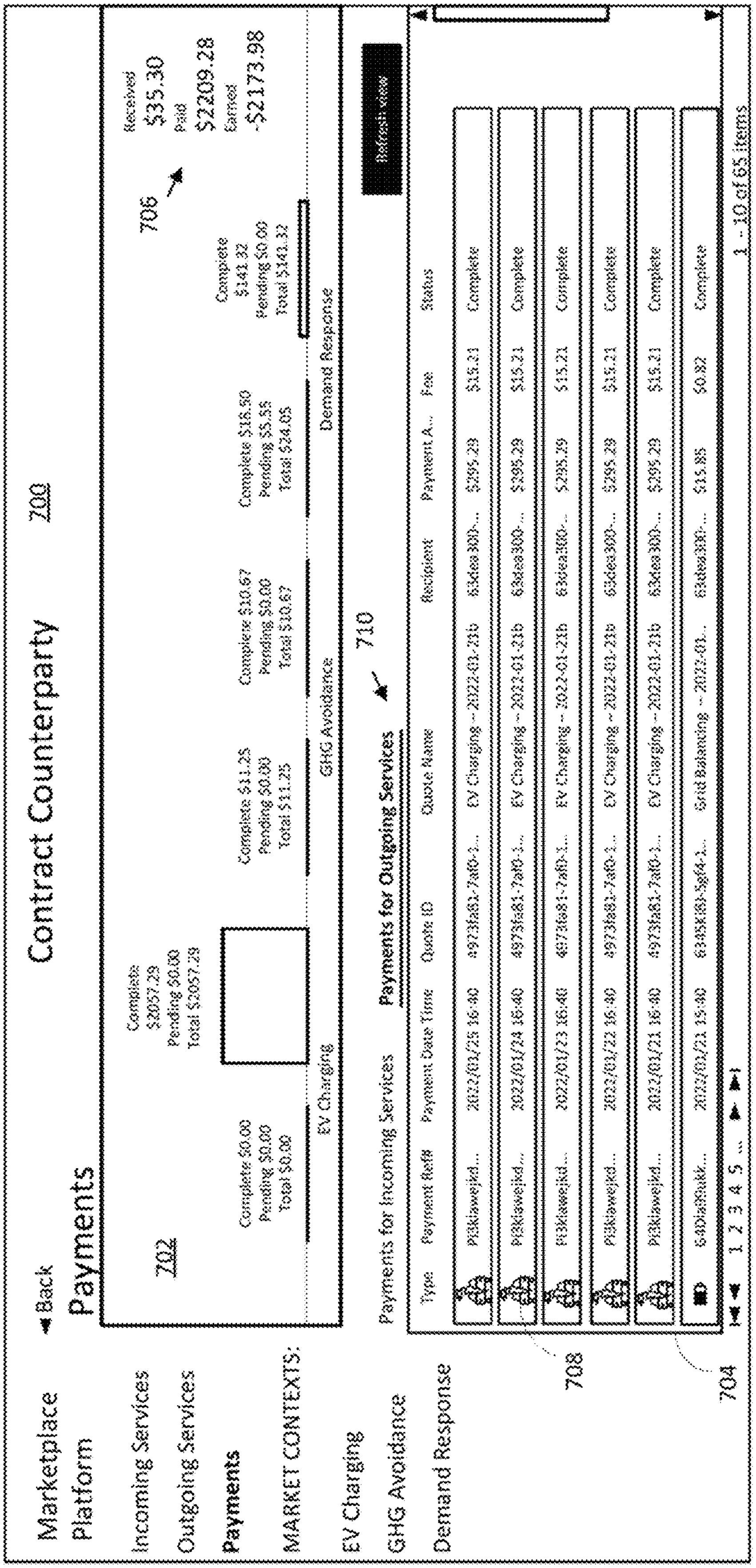

FIG. 7 is a screenshot of a payments interface 700. Payments information is shown in a graphical form in graph region 702 and tabular form in table region 704. Graph region 702 shows incoming and outgoing payments by service type as well as total related information 706. Table region 704 shows individual payments e.g. 708, such as by type, payment reference, date and time, quote ID, quote name, recipient, amount, fee and status. The table shows incoming or outgoing payments via tab selection 710.

Figure 8:
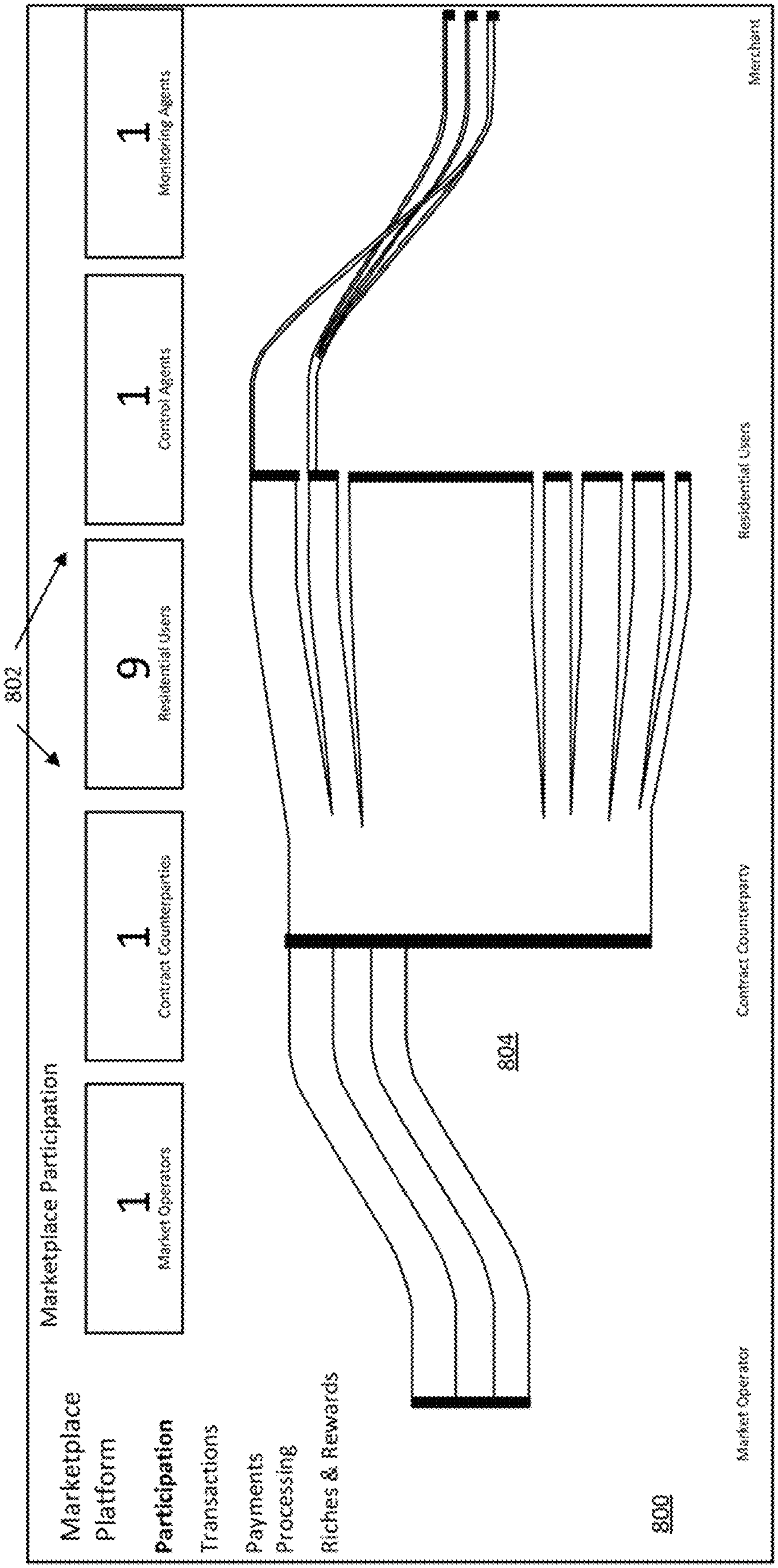

FIG. 8 is a screenshot of a participation interface 800 for a platform operator. Participation interface 800 shows in region 802 high level statistics for numbers of participants. In graph region 804 there is shown a Sankey diagram providing the number of participants in the platform and the number of transactions flowing through these participants. A control region 806 filters transaction by market service type EV Charging, GHG Avoidance, Demand Response).

A "Transactions" control (e.g. in side tab region 808) selects a transactions interface (not shown) to provide high level statistics showing number of blocks on blockchain, the transactions per block, average transaction throughput (per hour), and maximum transaction throughput (per hour) numerically or graphically. In a graph region, there is provided a visual graphic showing the number of blockchain transactions per transaction state/type (e.g. registration, contracting, execution, verification, settlement, and exchange).

A "Payment Processing" control (e.g. in side tab region 808) selects a transactions interface (not shown) to provide high level statistics showing number payments pending and completed based on each market service (e.g. graphically) and a table showing all the payment transaction history and associated information. A payment item can be selected to drill down. For example, if a payment status is "Failed", a "Paid to" identifier can be selected to view more information. In an example, a pop-up is displayed with more information and a control to invoke to process pending or failed payments.

A "Riches & Rewards" (e.g. in side tab region 808) selects a riches & rewards interface (not shown) to provide high level statistics (e.g. graphically) including total token rewards generated, total token balances, tokens spent vs earned, and payments made by market service over time. The high level statistics can be shown by market service type, date, etc. A graphical region provides a Sankey diagram showing, in applicable tabs. Number of Transactions: Number of transactions based on each participant in the platform; Token Reward Value: Number of tokens settled based on each participant in the platform; and Dollar Value: Dollar value of payments settled based on each participant.

With ref. again to FIG. 8, clicking a "Settings" in control region 810 invokes a setting interface (now shown) where input is receivable to configure various settings. In a residential user credibility threshold region, slider type controls are available to adjust score values to achieve particular ratings (e.g. poor (e.g. 0-22), fair (23-49), good (50-60), great (61-80), and trusted (81-100)). In a transactions fees region there are fields to receive input for transaction fee (%) (e.g. 2%), and participant payouts such as a minimum payout threshold ($) (e.g. 8). The transaction fee is taken by the Platform Operator from each transaction on the platform 102. The minimum payout threshold (in dollars) controls how much earnings need to be reached before a payment can be sent to an end-user.

In a token generation settings region there are fields to adjust how many tokens will be issued per unit of delivered quantity per market service. In an example, EV Charging rewards are based upon per Wh reduced (e.g. 0.1 token per Wh reduced), GHG avoidance is based upon $gCO_2$ avoided (e.g. 0.15 tokens per $gCO_2$ avoided) and Demand Response is based upon Wh contributed (e.g. 0.05 tokens per 2H contributed). A "save" control saves any changes made to the settings interface.

FIGS. 9A-9E, 10A, 10B, 11, 12A and 12B are screenshots of a mobile application interface for a residential user. In the present example, the user interface relates to a mobile application, though a web-based interface can be similarly configured. A user can download the mobile application such as from a server providing an application store (an e-commerce platform) for distributing applications as is well known. Such platforms are often responsive to the operating system executed by the mobile device associated to the user. In an embodiment, the mobile application has respective interfaces (all not shown) to: 1) sign in to an account and/or create an account with platform 102; 2) set up (e.g. associate) the users particular DERs to the account and application, for example, via a gateway to the control agent employed by the user and 3) set up the account with payment information, for example, to receive payment for participating in market services using the platform, via the settlement service.

In an embodiment, setting up an account is associated with a tutorial, for example, to teach a user about the platform, how to participate in market services, the importance of credibility, and payments and rewards among other topics. The tutorial (or portions of it) can be reviewed at any time (e.g. postponed to a later time or times). In an embodiment, DER device set up requires a control agent account with a control agent. Setting up a DER device with the platform 102, in accordance with an embodiment, includes providing control agent identification information for the DER and testing to ensure communication with the DER is enabled. The DER device set up interface is configured to enable a user to: select the provider(s) of the energy device(s) in the user's home (e.g. from a dropdown list of providers configured to work with the platform 102); enter the device ID of the user's energy device; click 'Test' to confirm the correct device ID was entered; and receive notification of a successful connection to the device (e.g. indicated by a green checkmark). Each DER device can be so enrolled to the account and application.

In an embodiment, payment set up requires a settlement account with the settlement service. The payment interface of the mobile application for platform 102 is configured to enable a user to: establish a payment account via the settlement service, if not already available, including entering various personal information (name, address, etc.) and financial institution information (currency, transit number, institution number, bank account number, etc.); and enable notifications for payments.

FIGS. 9A, 9B, 9C, 9D, 9E, 9F and 9G are screen shots of a home screen interface 900. Home screen interface 900 provides a timeline (e.g. 902) of energy service requests that are: In Progress (e.g. 902A): energy service requests that are currently active and happening now on devices in the home, that is, those under contract where a tender was accepted by the market clearing operations. The delivery period of the contract may be in the future or may be current; Upcoming (e.g. 902B): energy service requests that are coming up in the future with the opportunity to opt-in, that is, submit a tender in reply to the quote; and History (e.g. 902C): list of all the quotes that the user participated in, missed or were rejected from participating, and reward redemption. Clicking on a '+' control (e.g. 904 of FIG. 9A) expands a timeline section and views the events in the section. Clicking on a '-' control (e.g. 906 of FIG. 9B) minimizes the timeline section. Clicking on a filter button control (e.g. 908 of FIG. 9C) expands the filtering options for a timeline section. Click on the filter icons (e.g. 908A) to filter the timeline section by the type of energy service or rewards.

Graphic section 910 shows icons and associated controls for earnings 910A, rewards 910B and credibility 910C information. The icon's presentation can vary in response to the user's associated values for earnings, rewards and credibility. Invoking the earnings icon (not shown) displays an earnings timeline graph (e.g. expanded below the icons and above the timeline 902). The timeline of earnings comprises a bar graph that indicates the new earnings for that day, total of how much earned to date (paid+pending), total of how much has been paid into the user's bank account; and total of how much is pending to be paid into the bank account (i.e. pending due to payment threshold). Invoking the rewards icon (not shown) displays rewards by market service type, for example, a current balance of rewards earned for the Managed EV Charging service, earned for the GHG Reduction service and earned for Grid Balance service (includes both availability and delivery rewards).

Figures 9A, 9B, 9C:
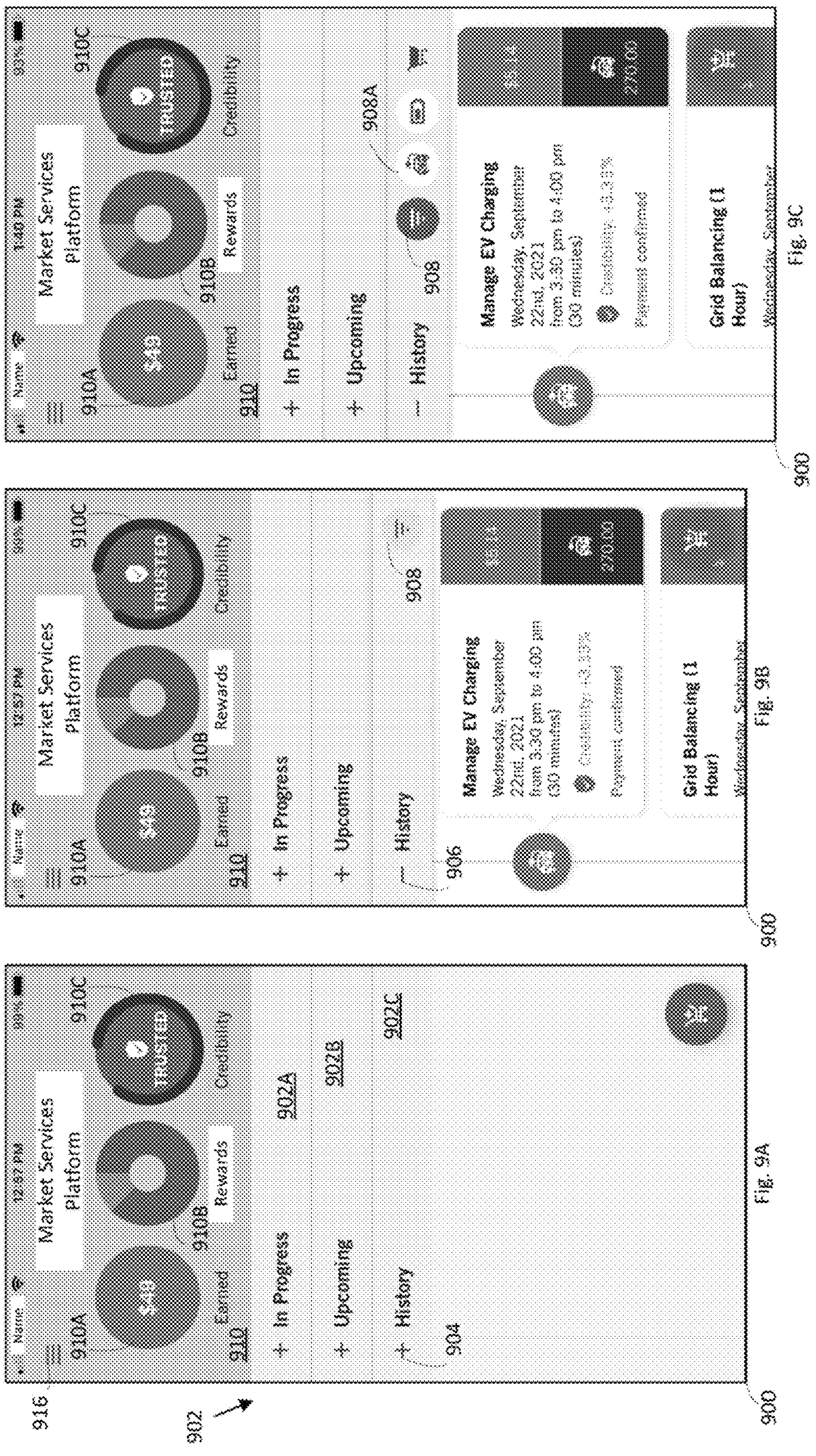
Figure 9D:
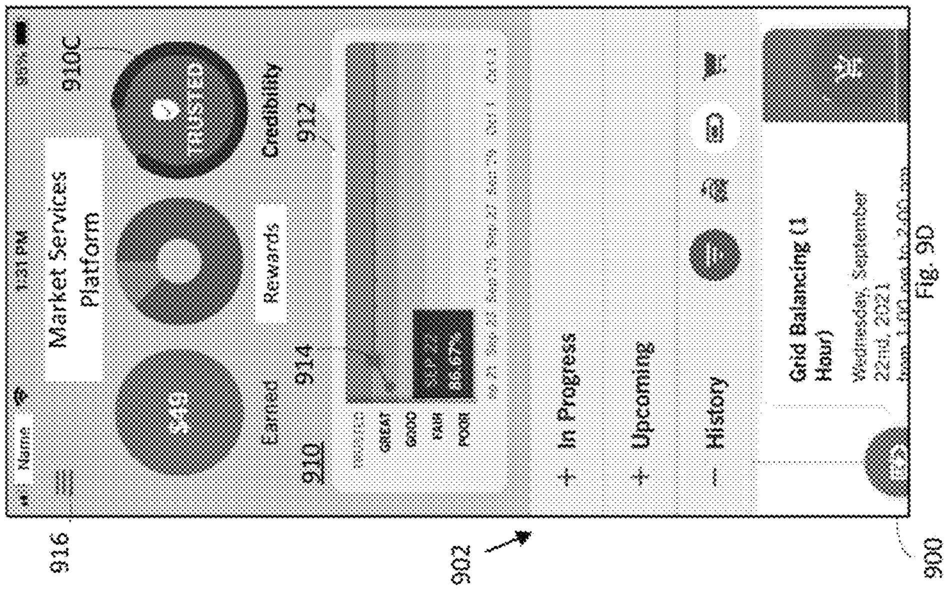

As shown in FIG. 9D, invoking the credibility control 910C expands the graphic section 910 to display a timeline graph 912 of how the use's credibility status has changed based on the user's participation in energy services. Clicking on a dot (e.g. 914) on the credibility timeline graph 912 invokes the interface graph 900 to present a score associated with the credibility status on a particular date.

Figure 9E:
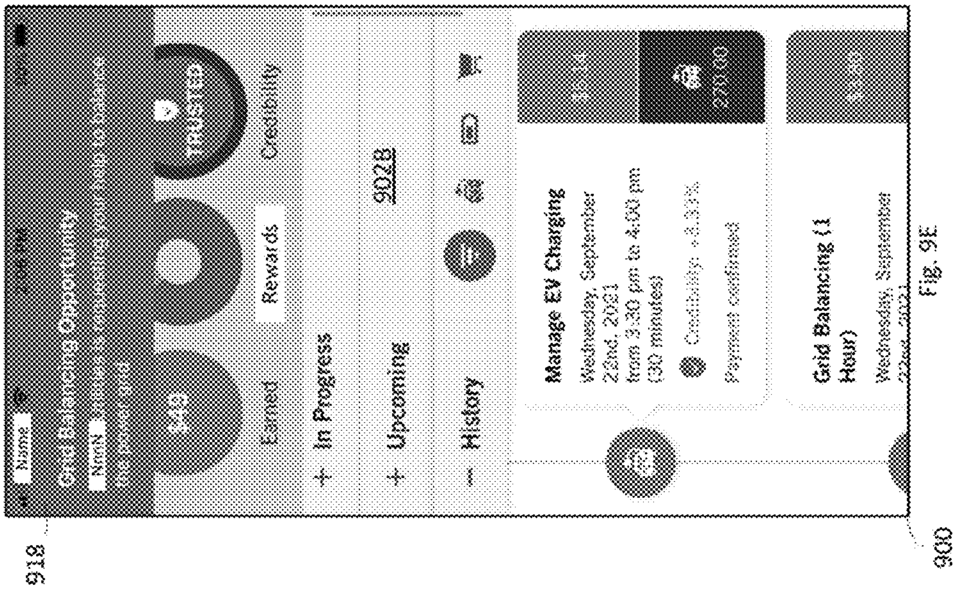
Figure 9F:
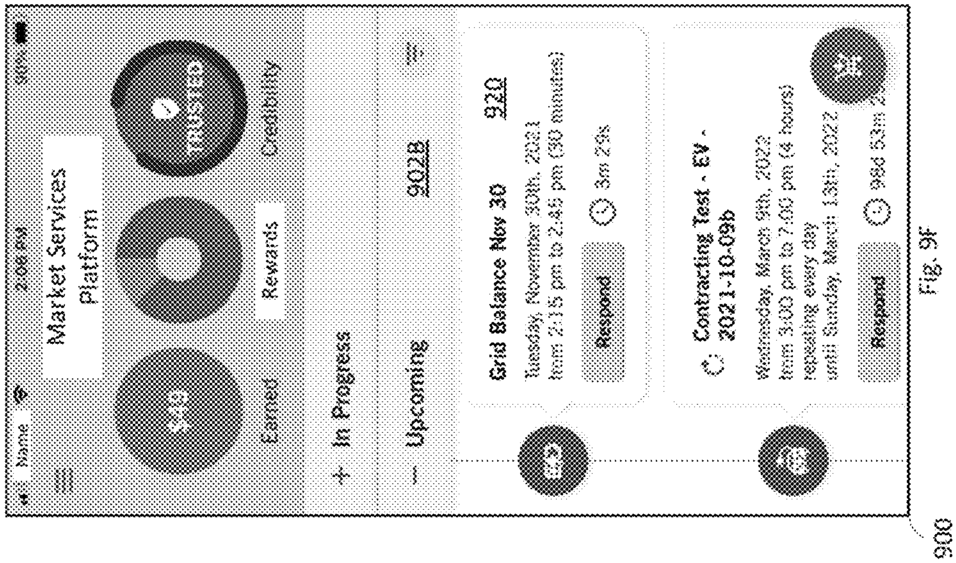
Figure 10B:
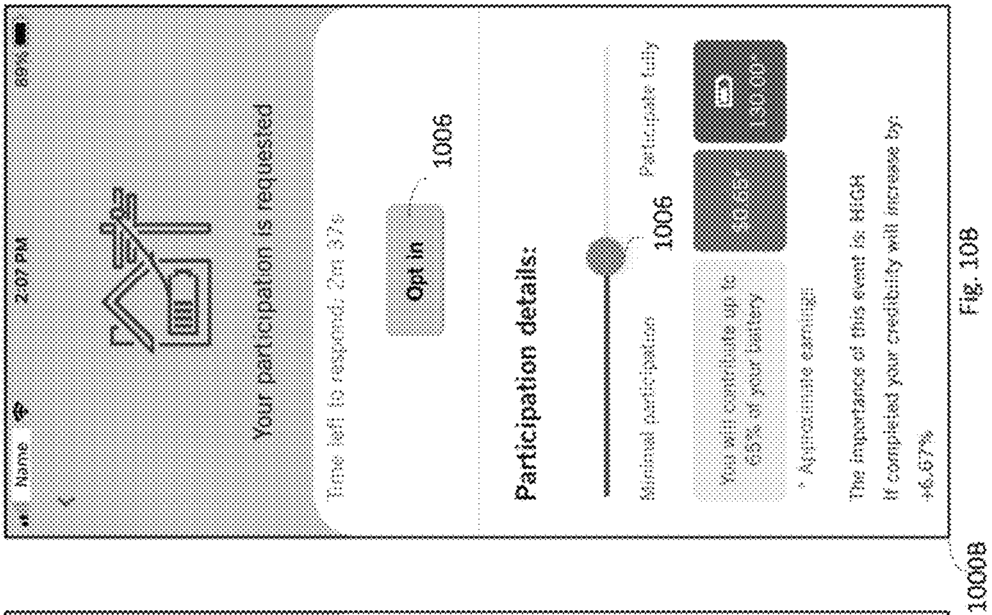
Figure 10A:
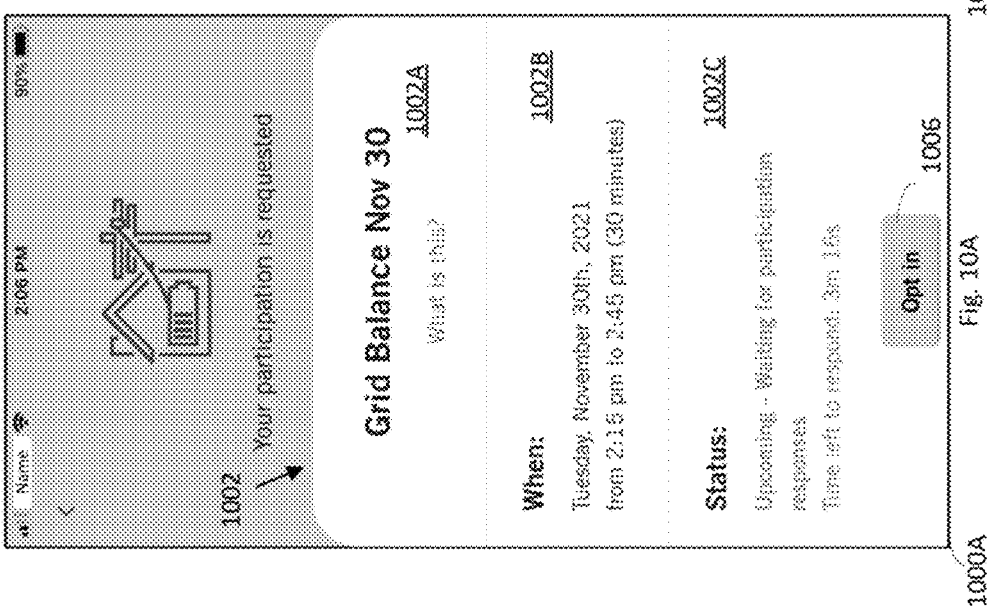

Enabling push notifications (e.g. at set up or via a control accessible via menu 916) permits the mobile device (e.g. via the native operating system and/or mobile application) to present a notification of a communication from a contract counterparty, for example, to present a notification when there is a new energy service request for participation by the user. FIG. 9E shows a notification 918. Interface 900 enables as a user to navigate to the upcoming timeline section 902B and click on a new request tile 920 (of FIG. 9F) (graphic with a control) to view more information. FIGS. 10A and 10B are screen shots showing an interface divided as parts 1000A and 1000B to opt in (and complete a tender) or not to opt in. Interface 1000A/B is invoked from tile 920 for example and interfaces 1000A and 1000B are navigable such as by scrolling.

Interface 1000A is enabled to present quote information 1002 including market services type 1002A, time of participation (e.g. date, time and duration of the request) 1002B and the status of the request and the time left to respond to the request 1002C. Interface 1000 is enabled to present a description of the type of energy service (e.g. via control 1004).

Interface 1000B is enabled to receive participation information with which to complete and transmit a tender in reply to the quote received such as via "opt in" control 1006. A slider control 1008 enables left and right adjustment for the level at which the user wants to participate in the request. That is, how much use or capacity of the DER device is to be used when participating. For recurring event type quotes, (such a EV charging) where there are multiple events within the parameters of the quote (e.g. 5 days in a row at a particular time period), the interface can be configured to enable receipt of input to select which days to participate (not shown).

Quote participating information (1010) is presented such as, an estimation of the approximate earnings to be gained from participating in this request, an estimation of the approximate (token) rewards to be gained from participating in this request; the importance level the utility (contract counterparty) has assigned to the request (Normal, High and Critical); and an estimation of the approximate credibility score increase the user could gain from participating in this request.

Figure 9G:
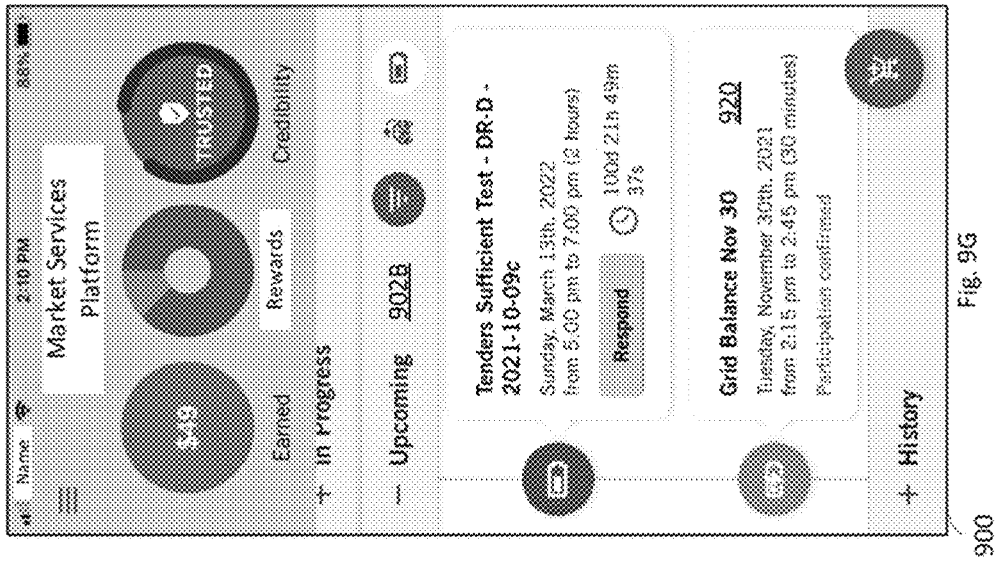

After opting into a request, a notification is presented (not shown) indicating participation is not yet confirmed. Participants are selected once the utility has received all the applicant bids (tenders) to that request within the gate time. An event status will remain in 'Awaiting confirmation' until the utility has selected participants and can be shown in the upcoming timeline 902C for the item (not shown). If the user is selected to participate, the event status in tile 920 can be updated to "participation confirmed" as shown in FIG. 9G. Selecting tile 920 can invoke an interface (not shown) to opt out of the contract. Once the event start time elapses, the event moves (not shown) to the in-progress section 902A of the timeline. The user can view the live count down on the event tile. A graphic icon associated with the event can have (e.g. a radial) graphic element to indicate event progression. Clicking on the event tile can present more information on the in-progress event, including control to opt-out an in-progress event (not shown). A warning message (e.g. a pop up) can be presented to indicate opting out will have a negative impact on the credibility score. In an embodiment, no earnings or rewards are awarded for events that are not successfully completed.

When an event has completed, the event is viewable in the history timeline (902C) (not shown). Once an event is complete, participation in the event is verified to confirm the user met the obligations such as previously described. Selecting (e.g. clicking) a tile for the event can invoke interface 900 to display more information. Some information (e.g. rewards, payment, and/or credibility) can be incomplete while verification is pending. If participation was successful, a "payment pending" status can be displayed indicating the payment for the event will be paid out once a payment threshold is met. Payment obligations can be aggregated until a threshold amount is obtained and then payment is invoked to reduce payment instances and associated per transaction costs. Once the payment threshold is met, the payment is sent directly into the bank account and the status of the event changes to 'Payment confirmed' (not shown).

Figure 11:
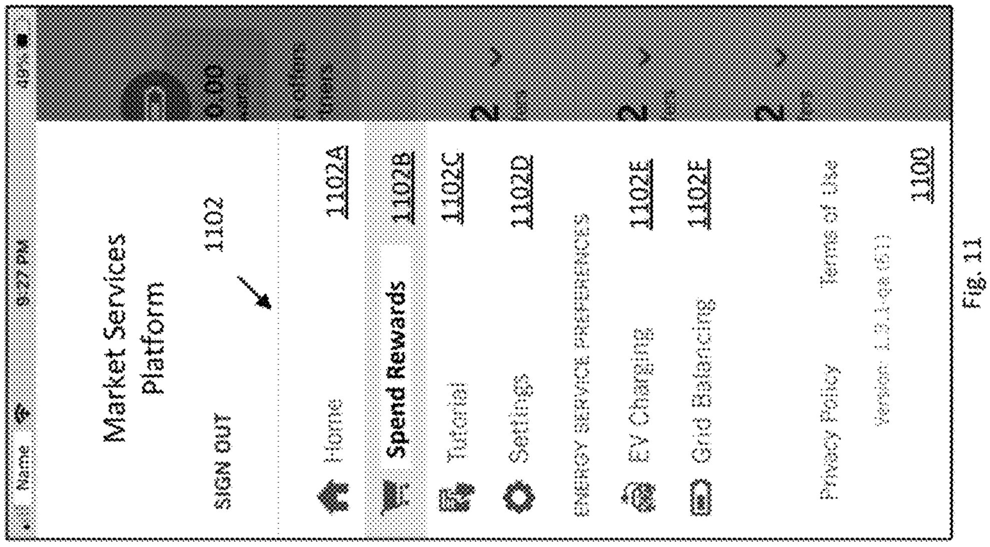

FIG. 11 is a screen shot of a menu interface 1100 having a list section 1102 with controls to invoke respective interfaces including a home interface control 1102A, a spend rewards interface control 1102B, a tutorial interface control 1102C, a settings interface control 1102D, and for energy services an EV charging interface control 1102D and a Grid Balancing interface control 1102F. Not shown, as such is not applicable to the user, is a GHG interface control. The particular user does not have a qualifying DER.

Figure 12B:
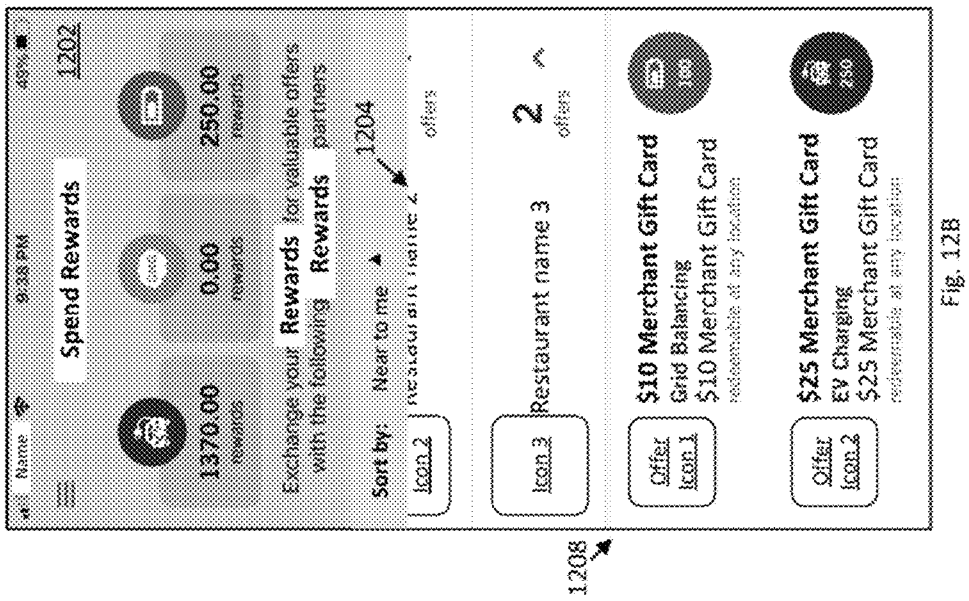
Figure 12A:
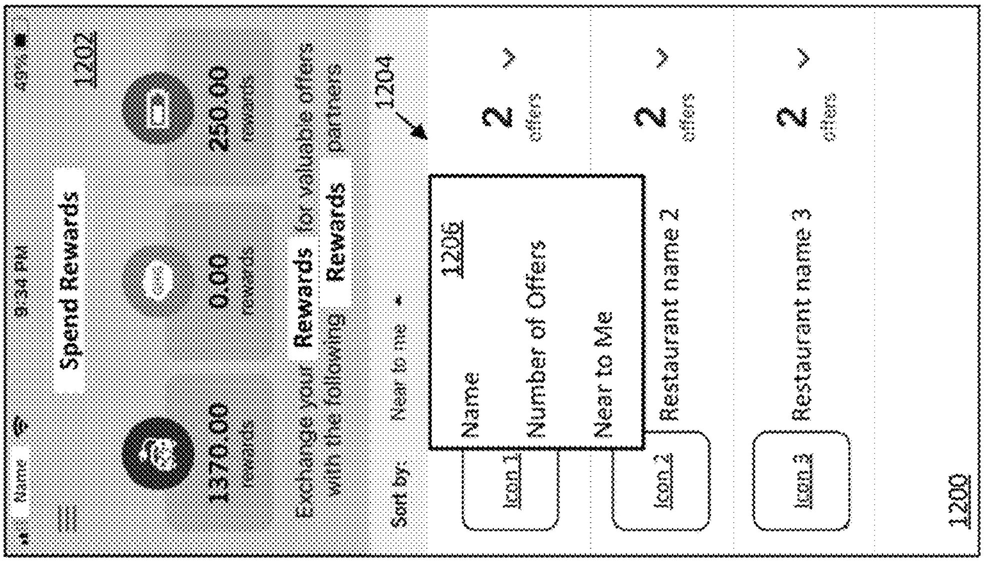

Selecting "Spend rewards" (e.g. the associated icon of tile control 1102B) invokes a spend rewards interface 1200 as shown in FIG. 12A to spend earned rewards with one or more participating merchants. Spend rewards interface 1200 displays a reward information section 1202 listing rewards by reward type—each market service generates its own type of reward (via applicable tokens). Spend rewards interface 1200 displays also presents merchant offers such as in an ordered listing in listing section 1204. Generic merchant names and icons are shown for simplicity. The ordered listing in section 1204 can be responsive to a geographic location of the mobile device to present merchants by proximity. In an embodiment, merchants can be filtered/sorted (e.g. control 1206) by one or more of: Alphabetical order by Name, Number of Offers; Proximity (Near to me). The mobile application can be enabled to use a GPS or other location feature of the device (not shown). In an embodiment (not shown), merchants are presented on a map centered about the location of the mobile device or another location as selected by the user, for example. Merchants can offer one or more offers and such can be responsive to reward type.

As shown in FIG. 9B following a selection of a one of the merchants (e.g. Restaurant 3) in the listing section 1204, the listing section is expanded at 1208) to present more details of the two offers such as product offer description and reward cost. These respective offers relate to different reward types.

Though not shown, the interface is enabled to receive input (e.g. a click) associated with an offer to invoke a purchase interface to redeem the applicable reward type and amount to obtain the offer. In an embodiment a purchase initiation message is displayed to indicate the purchase is pending confirmation from the merchant. The user can confirm the purchase, receive a note that the purchase is pending and return to the spend reward interface. From the purchase initiation message interface, the user can cancel to not obtain the offer. In an embodiment, a purchase confirmation by the residential user triggers by platform 102 the generation of a message to the merchant to confirm and fulfill the purchase. The message (or other data for the purchase that is to be presented to the merchant) can include residential user information with which to complete the purchase (e.g. residential user name, email address, physical address, etc. as may be applicable) from user information stored to platform 102, as an example.

Though not shown, the reward redemption transaction can be monitored by a user via the home screen interface, an event is associated with the reward redemption transaction and is initially viewed (i.e. it is presented) via the In Progress timeline section 902A, while the status is pending confirmation by the merchant. For example, 'Awaiting shipment confirmation' status indicates the reward redemption is still pending and awaiting confirmation from the merchant. The respective tile with the event can be selected to show additional details such as status, reward details and number of rewards/reward type redeemed. When the purchase is confirmed, the reward status is updated to 'Purchase confirmed'. The event tile is viewable via the History timeline section 902C. The respective tile with the event can be selected to show additional details such as status, reward details and number of rewards/reward type redeemed.

Though an on-line purchase of a gift card is shown for reward redemption, other purchases are possible. For example, a delivery of a physical good via an online order is contemplated. In an example, an in-store (at a physical location/real world address), rewards could be spent for a product or service, etc. In an example, a quick response (QR) code can link to a web-page to perform a transaction to spend rewards on a specific product or service. The web-page can be configured to receive user information or provide to the user sufficient information to define a transaction to transfer tokens to the merchant's account, writing an applicant transaction to the blockchain to remove an applicable quantity of tokens from the user and deposit to the merchant, optionally, less a transaction fee. Alternatively the merchant can pay a transaction fee based periodically for example, responsive to a history of offers accepted by users over the respective period.

As shown in FIG. 11, menu interface 1100 enables invocation of the settings interface via control 1102D, and interfaces for energy services preferences to adjust the participation style for each energy service via controls 1102E and 1102F. In an embodiment, the settings interface (not shown) enables receipt of input to manage connected DER devices (e.g. to test or update a Device ID), and manage payment accounts. The settings interface can further manage other settings such as which events appear in the user's timeline (home screen) interfaces. For example, whether to present/view: 1) rejected energy service events opted into but that were not selected to participate (i.e. tender not selected due to insufficient energy available in device or low credibility score); and 2) missed energy service events box that the user didn't opt into due to missing the tender window (gate closed before any tender was provided). Notifications (e.g. push notifications) can be selected for receiving information for new events, events starting, and completed events.

After navigating to the EV Charging Preferences page from the menu, the EV charging interface (not shown) enables receipt of input to set a default participation rate (e.g. similar to the slider control of FIG. 10B) and a default participation style—whether opting it is automatic at the default participation or manual, requiring user intervention. A similar interface for GHG Reduction can be available from the menu interface 1100 (for user's having GHG applicable DERs) to select a default participation style. In an embodiment, the participation rate for GHG DERs is not selectable as typically renewable resources like solar or wind are not controllable—they are responsive to the environment during the time of the event. However, other types of GHG DERs may be controllable. For Grid Balance (e.g. Demand Response) a similar interface to EV Charging enables receipt of input to set a default participation rate and default participation style.

Platform 102 is enabled to provide merchants with a merchant interface such as a web-based interface (not shown) to define products and product offers such as for redemption via on-line redemption as described and to manage and monitor its offers and redemptions. In an example, a product interface for the merchant user enables receipt of input to define, for a respective merchant, one of the merchant's products that can be made available for purchase. A product could be a physical good, electronic good, a gift card or a service, etc. A merchant, as a user of the product interface component of the merchant interface, can input a product image and product description information and store the product data in a platform data store, for example, to define a product catalog.

In an example, an offer interface for the merchant user enables receipt of input to define specific offers for a product. A merchant as a user of the offer interface component of the merchant interface can input offer information and store the offer in a platform data store, for example, to define an offer catalog. In an example, the merchant user can invoke a 'New Offer' control to create a rewards offer associated a product in the merchant's product catalog. In an example, a drop-down menu is presented for selecting the product. A title of the offer is input and received. The title can include reward type and equivalent dollar value of the offer. More detailed information on the offer can be entered, such as a discount on services, location for redemption etc. In an example, a monetary (e.g. fiat currency) price is entered. Reward amount for use to purchase instead of money (e.g. number of tokens/points) is calculated automatically, for example, where $1 is equivalent to NNN rewards. The type of rewards, and the start date and end date are identified.

In an example, when a residential user purchases an offer requiring confirmation and fulfilment, the merchant receives a notification, for example, an email requesting the merchant to complete the purchase. The email can include a link to the merchant interface where redeemed offers pending completion are available through a timeline interface to confirm and/or fulfill the purchase. The merchant may be required to perform actions such as communicating electronically or otherwise with the residential user to deliver the purchased product. Once the merchant confirms fulfillment, a blockchain transaction redeeming the rewards can be written.

In an example, a home screen interface component of the merchant interface can include: a timeline showing redeemed offers by customers (e.g. to assist with confirmations); information showing rewards balance by reward type (as received from customers, as earned as a DER owner or both); a graph showing a timeline of rewards accumulation; and a graph showing the number of reward offers redeemed per product.

Figure 13:
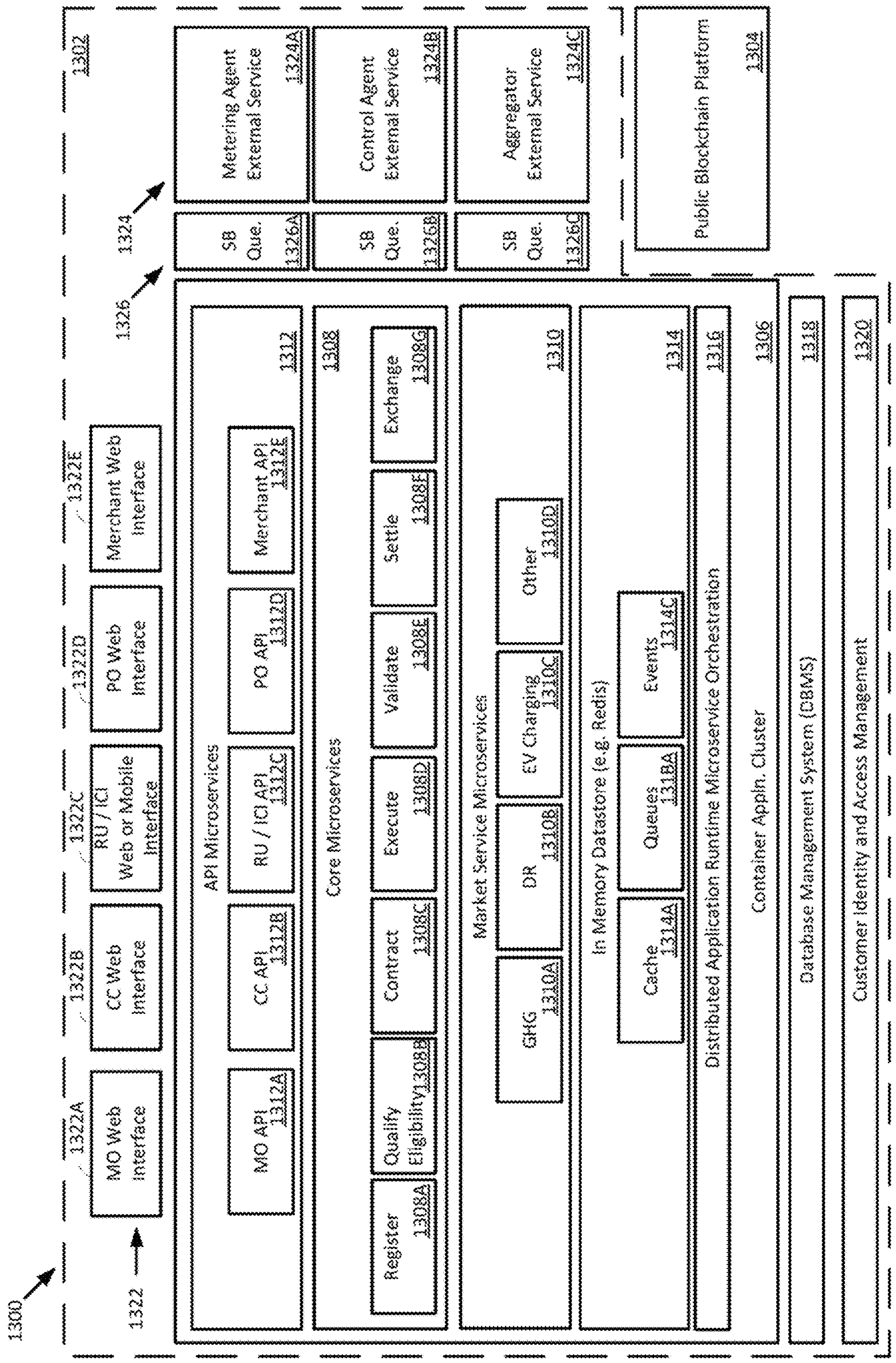
FIG. 13 is a diagram of architecture consistent with teachings herein.

It will be appreciated that FIG. 2 illustrate an energy transaction platform comprising peer-to-peer computing devices that provide and share data via a private blockchain storage approach. However aspects of the energy transaction platform can be implemented using other arrangements of computing devices. Some or all of the data stored to the blockchain of FIG. 2 can be stored to other data stores. For example, quotes and tenders, market clearing policies, rules or other code, verified participation and payment history, among other data can be stored to a data store that does not implement a blockchain. Such as a data store can comprise a database, which can be a relational database or not. Rewards or other tokens that are given such as in proportion to verified participation can be stored to a blockchain, which can be a public blockchain as an example. FIG. 13 illustrates a computer architecture 1300 comprising one of more computing devices. For convenience, the computing devices are shown as an energy transaction platform 1302 ("transaction platform 1302) within dashed lines and a public blockchain platform 1304 ("blockchain platform" 1304). It will be understood that each of transaction platform 1302 and blockchain platform 1304 can be implemented as respective pluralities of computing devices.

In the present embodiment, transaction platform 1302 provides centralized services for contracting participants in the transaction platform, working with third party services as shown. Transaction platform can be operated by a platform provider, which need not be a market operator, a contract counterparty, a DER aggregator, a DER owner or other party to the contracts for energy services provided by the transaction platform. In the present embodiment, transaction platform 1302 issues tokens via a public blockchain platform 1304, for example, to leverage available resources and enable transactions for such tokens with parties who may not be participants in the transaction platform 1302.

In the illustrated implementation, transaction platform 1302 comprises containerized applications (e.g. cluster 1306 (e.g., a Kubernetes™ cluster, (a trademark of The Linux Foundation)) comprising core microservices 1308, market service microservices 1310, API microservices 1312, in memory datastore components 1314 (e.g., REDIS™ of Redis Ltd.) and a distributed application runtime microservice orchestration component 1316 (e.g. Dapr™ of Microsoft Corporation).

Core microservices 1308 include register microservices 1308A, quality eligibility microservices 1308B, contract microservices 1308C, execute microservices 1308D, validate microservices 1308E, settle microservices 1308F, and exchange microservices 1308G. Respective core microservices 1308A-1308G are similar to components 102A-102G of FIG. 1.

Market service microservices 1310 include GHG reduction microservices 1310A, DR microservices 1310B, EV charging microservices 1310C, and other microservices 1310D. Respective market service microservices are similar to components 102H-102K of FIG. 1.

API microservices 1312 include MO API 1312A, CC API 1312B, RU or ICI API 1312C, PO API 1312D and merchant API 1312E, having similar components in FIG. 1.

In memory datastore components 1314 include cache component 1314A, queue component 1314B, and events component 1314C.

Transaction platform 1302 comprises a database and database management system (DMBS) 1318 (e.g., a cloud based database such as MongoDB™ a trademark of MongoDB, Inc.) and customer identity and access management component (e.g., Azure Active Director B2C™, a trademark of Microsoft Corporation) It is understood that one or more of the components of transaction platform 1302 can be provided by a computing device providing a service such as a cloud-based service.

Transaction platform 1302 comprises a plurality of user interfaces 1322 including market operator web interface 1322A, contract counterparty web interface 1322B, RU/ICI web or mobile interface 1322C, platform operator web interface 1322D and merchant web interface 1322E having similar components in FIG. 1 (some of which may not be shown). The user interfaces are similar to those described with reference to FIG. 1, etc.

Transaction platform 1302 comprises a plurality of external service interface components 1324 coupled by respective service bus queues 1326 (comprising individual buses 1326A, 1326B and 1326C). External service interface components 1324 include components for a metering agent external service (1324A), control agent external service (1324B), and an aggregator external service (1324C). Metering and control agent external services are similar to those described with reference to FIG. 1, etc. configured for the transaction platform of FIG. 13.

The aggregator external service 1324C comprises an interface to work with respective aggregators of DER devices. That is it works with the respective devices of such aggregators providing a different avenue to the core microservices and market service microservices of transaction platform 1302. In this way, data is exchangeable with the transaction platform 1302 but without a web-based interface such as one of interfaces 1322 provided by transaction platform 1302. Aggregator external service 1324C can be configured in accordance with how the aggregator participates in the platform.

A web-based interface for an aggregator could be provided by transaction platform 1302. For example, it will be understood that in an embodiment, transaction platform 1302 can comprise an aggregator API microservice and aggregator Web interface.

Whether configured as web-based interface components (not shown) or as aggregator external service 1324C, the platform interface components for an aggregator can be configured in accordance with how the aggregator is participating in transactions on the platform 1302. Where an aggregator acts similarly to a contract counterparty, for example, replying to MO quotes, and/or issuing its own quotes to its DER Owners, the platform interface components are configured to facilitate such activities and can be similar to a contract counterparty interface as described herein. If the aggregator is acting similarly to a DER owner, but having an aggregation of DER devices, the aggregator interface can be similar to the DER owner interface as described herein, for example to receive CC initiated quotes and to respond to same. The aggregator may enroll a plurality of DER devices to the platform and contract with, for example, a contract counterparty for use of the respective devices. The aggregator can build and employ its own user interfaces, which may be web-based, for its operations and for DER owners.

Thus the transaction platform is configurable to enable the chaining together of a plurality of parties to negotiate and execute contractual obligations for energy services, supported by underlying DERs. Aggregators represent a type of party that is very similar to a CC, but that does not (necessarily) leverage the end-user interface of the platform as previously described as a means for interacting with the DER owners.

As noted transaction platform 1302 can be enabled to issue or otherwise transfer tokens to DER Owners for verified participation under a contract for one of the market services. Typically, such tokens are issued in proportion to the participation. The tokens can be relative to price, a quantity of energy used by the DER Owner or produced by the DER owner, per transaction concluded (e.g. X tokens per bid, Y tokens per accepted bid, Z tokens per successfully completed contract, etc.) or any other behaviour. Platform 1302 can receive information such as via a metering agent to verify applicable behaviour. Such data can include metering information such as for the owner's DER device.

In an embodiment, a market service (e.g. 102K or 1310D) relates to a credit program established by a governmental regulatory agency or other body. The credit programme incentivizes a particular energy behaviour and issues credits in proportion to the energy behaviour. In an example, the behaviour is electric vehicle charging, for example, providing an amount of credits per measure of energy used for EV charging. In an embodiment, a transaction platform (e.g. either platforms 102 or 1302) is configured to provide a related market service for such a credit program, concluding contracts between owners of EV charging related DER devices and an initiator such as a contract counterparty providing energy for such charging. Credit program tokens are issued in relation to the verified participation. In an embodiment, the platform operator and credit program provider can have an agreement that credit program tokens issued by platform operations are useful to verify the incentivized behaviour under the credit program. The tokens can be converted to credits under the respective program.

Credit program tokens can be transferred, for example, to a party who aggregates such tokens to have sufficient credits. Credits can be purchased, sold and transferred such as in a market for such credits. Purchasers can be those who have energy behaviours that are disincentivized under the credit program. For example, those who use energy for (selected) other uses than EV charging.

Figure 14B:
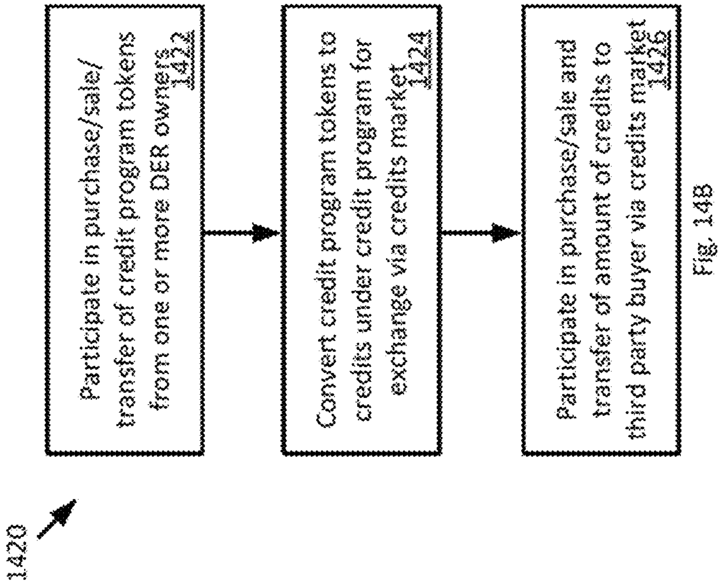
FIGS. 14A, 14B, 15A and 15B are flowcharts of operations in accordance with examples herein.
Figure 14A:
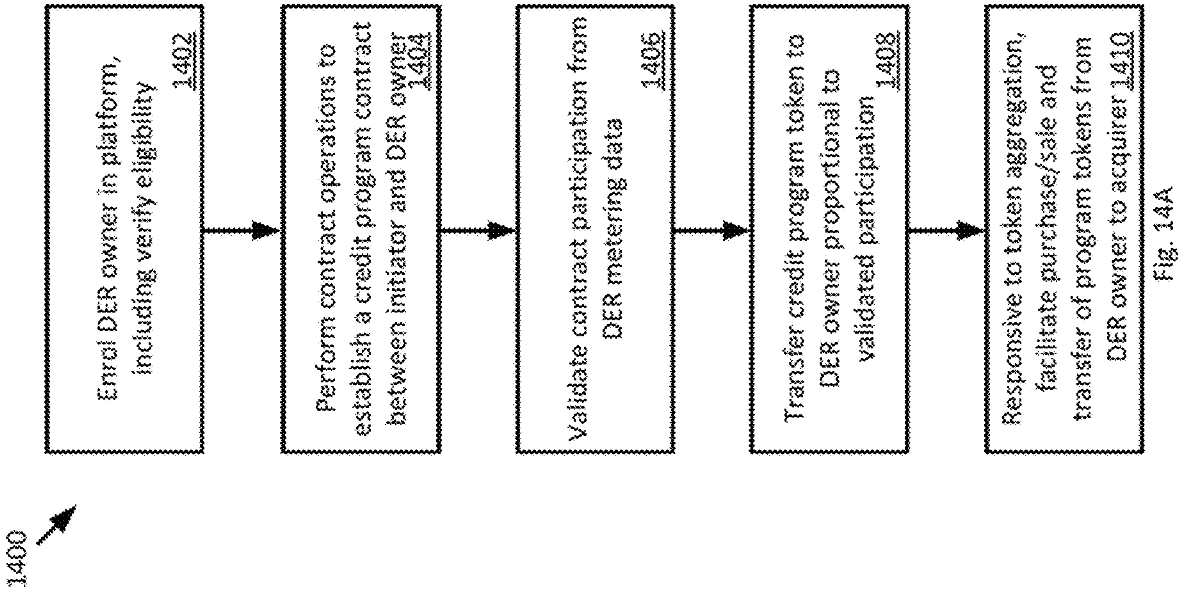

FIGS. 14A and 14B are flowcharts of operations 1400 and 1420 such as for a process within the context of a credit program as described. FIG. 14A relates to operations 1400 of the transaction platform (e.g. 102 or 1302). At 1402 a DER owner is enrolled in the platform and the DER device is verified such as previously described. At 1404, contract operations are performed to establish a credit program contract between a quote initiator (e.g., a contract counterparty) and a bidder—the enroll DER owner. Bidding can be automatic. The contract provides for the monitoring of EV charging, for example, at any time the EV charging DER device is operated. Pricing can be at market rates at the time of the charging or in accordance with another market service contract at the time of the charging. That is, a charging operation of the DER device can be, but need not be, in the context of another market service such as a contract for EV charging market services as previously described. The EV charging activity can be initiated by the DER owner, for example, without activation by the platform via a control agent. However, such charging is still monitored by the metering agent.

At 1406, contract participation is verified, such as from DER metering data (e.g. via a metering agent service). At 1408 operations transfer an amount of a credit program token to the DER owner that is proportional to the validated participation (e.g. a formula determines the token amount per amount of energy consumed for such charging). The credit program tokens are available to another party, for example such as to purchase from DER owners. If the tokens are on a public blockchain (e.g. blockchain platform 1304), the transaction platform may have no or few operations to perform the transfer on the blockchain, though the platform may provide an interface such as to a DER owner to facilitate in a transfer transaction via the public blockchain platform. If the tokens are on a private blockchain, such as described in relation to FIG. 2, the platform can provide such an interface, and the platform (and other nodes implementing such a blockchain) can perform operations to make the transfer. In an embodiment, the transaction platform monitors a quantity of credit program tokens held by the DER owner and once a threshold is achieved, the DER owner is prompted (e.g. a push notification or via web/mobile interface) to sell the tokens. A communication can be sent to the acquirer.

At 1410, operations facilitate the purchase/sale and transfer of credit program tokens from DER owner to an acquirer such as in response to token aggregation by the acquirer who desires to purchase the credit program tokens.

FIG. 14B shows operations 1420 of a credit program token acquirer (e.g., operations for a device operated by such an entity (not shown)). At 1422, the acquirer participates in a transaction (e.g. as buyer) to acquire credit program tokens from the DER owner. The transaction platform 102 or 1302 can communicate to the acquirer device such as to prompt the acquirer device to perform the transaction with the DER Owner.

The transaction can be an e-commerce transaction that results in a payment and a transfer on the blockchain holding the tokens. In an embodiment, the transaction is via a private blockchain such as provided by the transaction platform. In an embodiment, the transaction is performed via a public chain where the tokens are held.

At 1424, the acquirer converts the tokens to credits under the credit program for exchange with another party via a credits market. In an embodiment, the credit program tokens are returned such as to the platform operator or other credit program token source account such as for transfer to a DER owner in response to new instances of the incentivized behaviour. In another embodiment, the tokens are destroyed and not reused. For example, each credit program is minted and transferred to the DER owner for one time use only.

At 1426, the acquirer participates in a purchase/sale and transfer of the credits under the program to a third party buyer in the credits market.

While the credit program and FIGS. 14A and 14B are described with reference to EV charging, other energy behaviours can be incentivized, monitored and verified for generating tokens. For example, a behaviour can be the generation of energy from a clean energy source such as solar or wind based DER device, or a non-DER device such as a nuclear energy facility. Clean energy credits are issued under the program. Clean fuel type options can include bioenergy, energy from waste, geothermal, hydroelectric (e.g., from run of river or reservoir), landfill gas, nuclear, solar, and wind.

In an embodiment, the platform can provide the marketplace to exchange credits under a credit programme. Tokens can be issued in the same proportion that credits are awarded for the behaviour. One token can represent one credit. For example, if generating 1 MWh of clean energy (or portion thereof) earns 1 credit (or portion thereof), then 1 token (or portion) is given under an associated platform contract.

Credits can be awarded to residential users, ICI users or others who generate the clean energy. A market service can be implemented and contracts issued via the platform. The platform verifies participation and issues tokens accordingly.

Figure 15B:
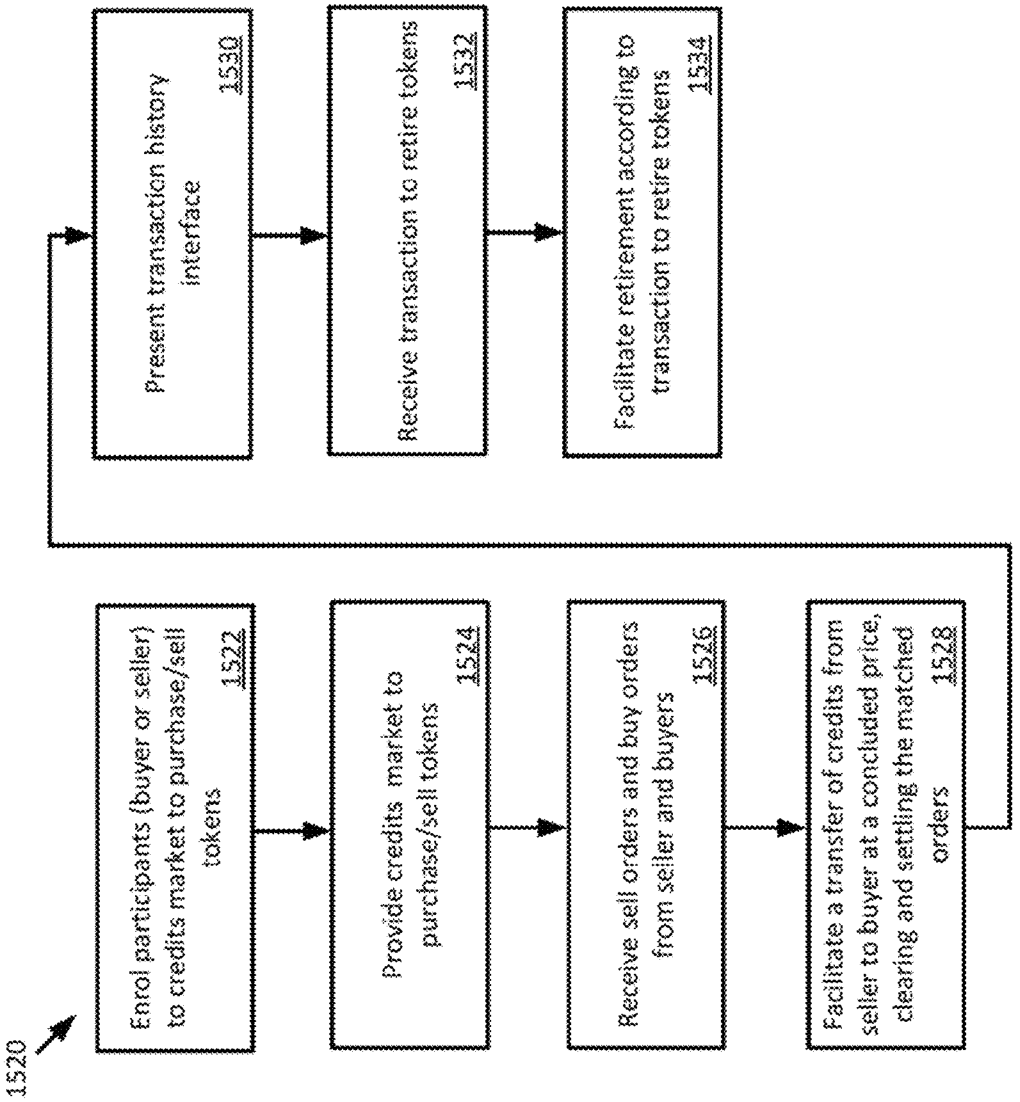
Figure 15A:
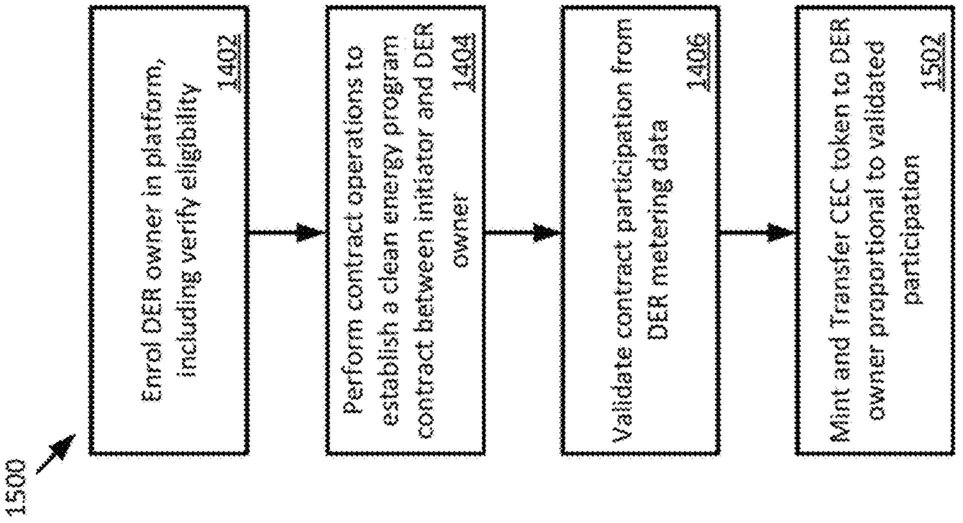

FIG. 15A shows operations 1500 for a DER owner under the clean energy program where tokens represent credits, many of which operations (e.g. 1402, 1404 and 1406) are similar to operations 1400. Operations in respect of a nuclear facility owner are not shown. The tokens are equivalent to clean energy credits (CECs) under the clean energy program. At 1502, each token (or portion) is minted in association with the following credits information, which can be stored in blockchain records: Fuel Type; Facility Location; Generation Date; Asset Owner, etc. In an embodiment, the token is a form of a non-fungible token (NFT) having the associated attribute information. The NFT can be associated with other rewards or utilities, which can vary with the type of user generating the energy. For example, an NFT utility associated with a residential user can be different from a utility associated with an ICI user. An NFT utility need not be associated with an NFT.

FIG. 15B shows operations 1520 providing a credits market via a platform for the purchase and sale of tokens according to a credits program. In an embodiment, the tokens are equivalent to CECs. Operations 1520 are performed by a computing device or devices, which may be the same device or devices providing the transaction platform. At 1522, operations enroll participants such as buyers and sellers, for example, into the credits market. Enrollment can be facilitated via a user interface (not shown). Buyers can be companies or other entities that wish to purchase verifiable proof of clean energy usage for environmental, social and governance (ESG) targets, stakeholders, etc. In an embodiment, a credits-receiving participant such as a residential user or an ICI user of the transaction platform can be enrolled in the credits market platform as part of enrollment in the transaction platform.

At 1504 a credits market is provided to purchase/sell tokens (e.g., as CECs) between buyers and sellers. The market is provided to enrolled participants via one or more user interfaces. Such user interfaces can include web-based or mobile based interfaces. In an embodiment, for example, for an enrolled participant, the user interface facilitates composing and placing of a buy order or a sell order. In an embodiment, the user interface presents credits information for credits held by the participant, in-progress order information for placed sell or buy orders that have not concluded and transaction history information for past transactions of the respective participant that have concluded. Transaction history information can include payment status information. Such information for the interfaces can be obtained from data stored to the blockchain and/or stored off-chain such as in another data store. Participants have respective computing devices (not shown) to interact with the credits market platform via the participant interface. Such devices can store or have access to blockchain wallets or other manners of storing blockchain key information for managing accounts and facilitating transaction signing.

The credits market can be configured to operate according to a trading mechanism with which to match buy and sell orders. The trading mechanism may be defined in accordance with regulations, rules or policies, etc. for matching as established by the credits program associated with the credits. For example, the program may specify that credits have a fixed price or that the price can be determined by the market and therefore fluctuate. The trading mechanism for the credits market can be configured accordingly. In an embodiment, the credits market is a bid/ask type market. In an embodiment, the market automatically matches buy and sell orders at a specified (e.g. pre-set fixed) price.

At 1524, operations receive sell orders and buy orders from sellers and buyers. At 1526, operations facilitate a transfer of credits from seller to buyer at a concluded price according to the trading mechanism, clearing and settling the orders. Operations at 1526 can include facilitating transaction information exchange and any applicable transaction signing, or example, to obtain a signed transaction for transferring the tokens on the blockchain from an account of the seller to an account of the buyer. Participant user interfaces can be configured to notify of pending transactions and request confirmation (e.g. via the in-progress order interface). For a buyer, confirmation can include invoking a transaction information exchange (e.g. providing the buyer's account to receive the tokens and providing it to the seller). For the seller, confirmation can include invoking a transaction signing for the transfer transaction to transfer from the seller's account to the buyer's account.

In an embodiment, the blockchain stores transaction history information and account information for all participants and transactions. In an embodiment, an off chain data store can store further associated information that is not on chain, or which may comprise a copy of on-chain data that is kept up to date (e.g. with each block written to the chain). A user interface to such data (e.g., transaction history information and account information for all participants and transactions, or at least some of it) can be provided, for example, to platform participants or others such as the general public. At 1530, operations provide a transaction history interface to present transaction history and associated information. Such information can include token minting information, credit information associated with respective tokens, and purchase/sale transaction information such as seller and buyer information, transaction price, date/time, etc. Such information can provide updated information on credits ownership, for example. The information can be provided to a regulatory agency or other entity administering the credits program, to participants and/or the public.

In an embodiment, in accordance with the credits program, credits can be used to offset another energy behaviour, such as use or generation of energy that is not clean. So that credits are only used for a single offset instance, "used" credits are retired in an embodiment. For example, credits (e.g. an amount of credits) associated with an offset instance can be transferred from the account of the party claiming the offset. A transaction can transfer the credits to a retired account on the blockchain or to an account of the regulatory agency or other entity administering the credits program. In an embodiment, credits information includes a flag or other data indicating whether the credits are available to offset or not available to offset under the credits program. In an embodiment, a transaction can update the flag when the credits are used. In an embodiment, no further transfer of such "used" credits is permitted. That is a used credit that is transferred to a retired account of or an account of an administering entity cannot be further transferred or credits with a used credit with a flag set as used cannot be further transferred. Smart contracts or chain policies or other mechanisms can be used to enforce the no further transfer limitation. At 1532, operations receive a transaction to retire tokens. As noted, such a transaction can transfer the tokens and/or update credits information associated with the tokens. At 1532, operations facilitate token retirement in accordance with the transaction.

Figure 16:
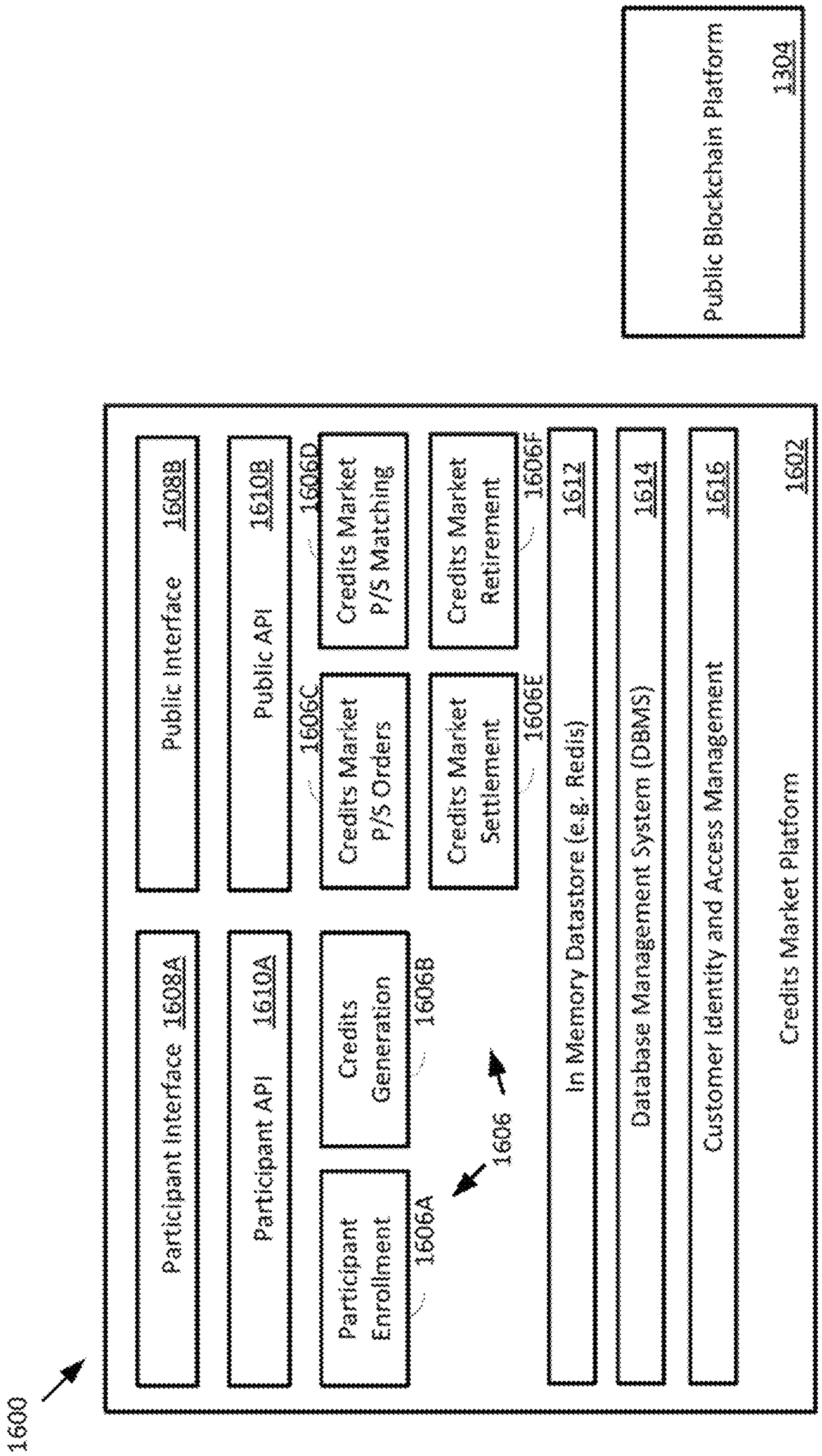
FIG. 16 is a diagram of architecture consistent with teachings herein.

While the transaction platform and credits market platform have been described in relation to generation or other energy services performed by DER devices such as associated with residential or ICI users, in a typical energy grid operated by a market operator, other entities generate and provide energy. Under a program for clean energy generation, for example, such entities can qualify for credits for appropriate energy generation and can transfer credits such as to buyers. In an embodiment, the credits platform includes interface components to enroll participants who are energy generators and to receive generated energy data and process such data to mint tokens in accordance with the program for transactions on the credits market platform. FIG. 16 is a diagram of architecture 1600 including a credits market platform 1602 and a public blockchain platform 1304 (e.g. as shown in FIG. 13). Similar to the transaction platform 1302 of FIG. 13, credits market platform 1602 can be implemented by one or more computing devices. Credits market platform 1602 provides a plurality of microservices 1606 including participant enrolment microservices 1306A, credits generation microservices 1306B, credits market purchase/sale orders microservices 1306C, credits market purchase/sale matching microservices 1306D, credits market settlement microservices 1306E and credits market retirement microservices 1306F. These can be containerized microservices with applicable supporting components (not shown). Interface components include participant interface 1608A, public interface 1608B, participant API 1610A and public API 1610B. Credits market platform 1602 comprises an in memory data store 1612, DBMS 1614 and customer identity and access management component 1616. The interface components and microservices 1606 perform functions such a previously described in relation to FIG. 15B and additionally provide functions for energy generators generating energy from facilities other than DER devices such as large scale generating sites for clean energy.

Entities generating large amounts of energy report such generation to a market operator. This reporting can be leveraged to mint credits. For example, via credits generation microservices 1606B and a participant interface, data for generated energy is received for the participant. The generated energy data comprises an amount of energy generated (e.g. number of MWh), location, fuel type, and market operator register information identifying the reported generated energy. In an embodiment the generated energy data is verified with the market operator. For example, though not shown, there is an external service interface to interact with a look-up/verify interface provided by a market operator computing device (not shown). Prior generated energy data for which prior credits were minted can be stored such as to an off-chain data store. The credits generation microservices 1606B can confirm that the generated energy data represents new energy for which credits were not previously minted.

Credits generation microservices 1606B mints tokens representing credits in accordance with the credits program (e.g. a formula, which might be 1 MWh=1 token=1 program credit), for example, as tokens are minted for residential or ICI users. The minted tokens are stored to the participant's account on the blockchain. The tokens are available to transact on the credits market. Buyers who are not energy generators can enroll as a participant. Credits market purchase/sale (p/s) order microservices 1606C receives buy and sell orders, the matching microservices 1606D matches according to the trading mechanism. A transaction transferring tokens is written and provided to the public blockchain platform 1304. Settlement is performed (e.g., by microservices 1606E). It is understood that the transfer (e.g. the transaction) may be held until settlement is cleared. Retirement of credits can be performed by retirement microservices 1606F.

The credits platform 1602 can transact any tokens associated with the credits program including those minted originally for DER owners and those for non-DER owners.

It will be understood that transaction based charges can be set and obtained for any transactions performed by the transaction platform or the credits market platform. Such charges can be paid to an account of the respective platform's operator or to a regulatory or other body managing the credits program.

In an embodiment, in addition to computing device aspects, a person of ordinary skill will understand that computer program product aspects are disclosed, where instructions are stored in a non-transient storage device (e.g. a memory, CD-ROM, DVD-ROM, disc, etc.) that when executed cause a computing device to perform any of the method aspects disclosed herein. In an embodiment, a computing device comprises a processor (e.g. a microprocessor (e.g. a CPU, a GPU, a plurality of any of same), microcontroller, etc.) that executes computer readable instructions such as those stored in the storage device. In an embodiment, the computing device comprises (for example "purpose built") circuitry that executes the functions of the instructions, for example, without the need to read such instructions. In an embodiment, a computing device can further comprise user interface components such as one or more of a display screen (which may be touch enabled (e.g. for gestural input)), a keyboard, a pointing device, a speaker, a microphone, a camera, a printer, a scanner and other input, output or input/output devices. In an embodiment, a computing device can further comprise, a GPS device, a network interface (whether wired or wireless), a near field communication (NFC) device, etc.

A method can comprise: responsive to a quote for supplying energy, receiving a plurality of bids from quote bidders to supply respective amounts of energy; storing credibility scores for each of the quote bidders, the score for a respective one of the quote bidders based upon a prior participation of the respective one of the quote bidders in a set of prior quotes for supplying energy; selecting successful bids from the plurality of bids in response to the credibility scores; wherein a supply energy from at least some of the quote bidders having the successful bids is thereby provided.

The method can comprise controlling the supply energy from at least some of the quote bidders having the successful bids. In an example, controlling can comprise communicating to energy generating devices to supply energy in accordance with the successful bids.

The method can comprise computing the credibility score for the respective one of the quote bidders and the set of prior quotes can comprise a plurality of recent quotes available for bidding by the respective one of the quote bidders. In an example, for each recent quote in the plurality of recent quotes: no bidding by the respective one of the quote bidders in reply to the recent quote can have a neutral impact to the credibility score; bidding by the respective one of the quote bidders in reply to the recent quote or successful participation by the respective one of the quote bidders in the supply of energy associated with the recent quote can have a positive impact to the credibility score; and cancellation by the respective one of the quote bidders or unsuccessful participation in the supply of energy associated with the recent quote can have a negative impact to the credibility score. In an example, the positive impact or the negative impact can be weighted in response to a credibility weighting factor associated with the recent quote. In an example, the method can comprise replacing an oldest one of the recent quotes in the set with the quote for the supply of energy and re-computing the credibility score for the respective one of the quote bidders for use to select a future bid by the respective one of the quote bidders.

In an example of the method, the quote is associated with a credibility weighting factor for selecting between bids in response to the credibility scores.

The method can comprise receiving the quote for the supply of energy and communicating the quote to a plurality of quote bidders having a capability to supply energy according to the quote.

The method can comprise enrolling each of the quote bidders to receive quotes for supplying energy, and enrolling can comprise receiving device information and device control information for energy supply devices associated with the quote bidders. In an example, the method can comprise confirming enrollment eligibility by testing respective energy supply devices using the device information and the device control information associated with the respective energy supply devices.

In an example of the method the quote bidders can be operators of distributed energy resource (DER) devices for the supply of energy, for example residential or ICI operators, who can be customers of a quote initiator of the quote.

A further method can comprise a method to provide a platform to transact energy services. The further method can comprise: establishing a contract between a quote initiator and a quote bidder for a market service in relation to a distributed energy resource (DER) device associated with the quote bidder; verifying participation of the DER device in the market service according to the contract; and providing an amount of rewards to the quote bidder responsive to the participation as verified.

The further method can comprise controlling the DER device to provide the market service according to the contract.

In the further method, the rewards can be spendable for a merchant product or service at merchants participating in a rewards program maintained using the platform.

In the further method, providing the amount of rewards can comprise recording the amount of rewards to an account of the respective quote bidder stored on a data store, wherein the amount of rewards is responsive to either or both of: an amount of payment in accordance with the contract; or a verified performance measure related to the energy service.

In the further method, the data store can comprise a blockchain, the rewards can be represented as tokens and the account can be stored on the blockchain.

In the further method, the rewards can reflect a verified performance measure of any one or more of: a green house gas reduction; or clean energy generated by a renewable or non-fossil fuel source; or other energy behaviour. In the further method, the amount of rewards can be determined in accordance with a regulatory or other program.

In the further method, the regulatory or other program can provide credits for energy behaviour, the rewards can comprise or can be exchangeable for credits, and the credits can be transferable via a credits market.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

The invention claimed is:

1. A computing device to provide a platform for transacting energy services, the computing device comprising one or more processors coupled to a storage device storing computer readable instructions that, when executed by the one or more processors, cause the computing device to:

receive a quote for providing a market service, the quote received from a quote initiator to establish at least one contract for providing the market service, wherein the market service is a selected one of a plurality of market services for energy generation, distribution or consumption;

communicate the quote to a plurality of quote bidders, each quote bidder associated with a respective distributed energy resource (DER) device of respective DER devices capable of performing the market service;

receive respective tenders in reply to the quote, the respective tenders received from at least some of the plurality of quote bidders;

store the quote and the respective tenders to a data store;

perform automated market clearing operations to automatically and transparently clear the respective tenders based on a gate closure for the quote and a ranking based on criteria comprising a device type of the respective DER device associated with each quote bidder of the plurality of quote bidders, wherein the automated market clearing operations execute on the computing device to generate optimized device control parameters based on the criteria and the gate closure;

store market clearing result information to the data store;

for a respective tender accepted for the quote by the automated market clearing operations:

establish a respective contract of respective contracts between the quote initiator and a respective quote bidder associated with the respective tender in response to the quote and the respective tender;

automatically adjust operation of the respective DER device associated with the respective quote bidder to perform the market service in accordance with the respective contract, wherein the respective DER device associated with the respective quote bidder is automatically adjusted via control signals using a control agent to physically adjust, in real-time, a first energy generation or consumption of the respective DER device associated with the respective quote bidder;

verify participation of the respective DER device associated with the respective quote bidder in performance of the market service; and store the participation as verified to the data store;

receive performance measures of the respective DER devices, the performance measures made during performance of the respective contracts;

store the performance measures for either or both of presenting to platform participants or verifying the participation;

receive participation verification information from one or more metering agents monitoring the participation of the respective DER devices to verify respective participation in the respective contracts;

communicate blockchain information associated with a blockchain to participants in the platform for transparency of platform operations, the blockchain information including any one or more of: participant information, quote information, tender information, market clearing information, participation information for the respective contracts, payment information, token information, or rewards information;

receive respective merchant product or service information and merchant offer information and publish respective merchant offers for spending rewards issued in response to verified participation;

communicate notifications of the quote to the plurality of quote bidders, the plurality of quote bidders determined in response to the market service and the device type of the respective DER device associated with the quote bidder;

for the respective quote bidder, any one or more of: provide an upcoming quotes interface for quotes available for a bid by the respective quote bidder; provide an in progress interface for the respective tender of the respective quote bidder accepted by the platform and where performance under an associated contract is not complete; or provide a history interface to present past event information comprising any one or more of tokens and/or reward spending information, information for each quote communicated for the respective quote bidder, including for quotes where no reply was communicated, quotes where a tender reply was not accepted, and quotes where the tender reply was accepted; and for the quote initiator, any one or more of:

provide an incoming services dashboard interface for presenting quote information for quotes received for bidding;

provide an outgoing services dashboard interface presenting quote information for quotes initiated for bidding on by another platform participant; or provide a payments dashboard interface for presenting payment information for quotes.

2. The computing device of claim 1, wherein the quote initiator is a contract counterparty and the plurality of quote bidders are any one or more of:

residential customers of the contract counterparty having the respective DER devices;

institutional, commercial & industrial (IC&I) customers of the contract counterparty having the respective DER devices; or DER device aggregators having a relationship with owners of the respective DER devices for providing the plurality of market services.

3. The computing device of claim 1, wherein the quote initiator is a market operator and the plurality of quote bidders are one or more contract counterparties to the market operator, the one or more contract counterparties having relationships with any one or more of customers having the respective DER devices or DER device aggregators having a relationship with owners of the respective DER devices for providing the plurality of market services.

4. The computing device of claim 1, wherein the quote initiator is a DER device aggregator having a relationship with owners of the respective DER devices and the plurality of quote bidders are the owners of the respective DER devices.

5. The computing device of claim 1, wherein:

the quote defines a second quote that is linked to a first quote;

the quote initiator of the second quote is a quote bidder providing a first respective tender for the first quote; and the automated market clearing operations for the second quote only accept second tenders for the second quote if market clearing operations for the first quote accepted the first respective tender for the first quote by the quote initiator of the second quote.

6. The computing device of claim 1, wherein the plurality of market services comprise one of electric vehicle charging, green house gas reduction, or demand response market services.

7. The computing device of claim 1, wherein, responsive to the participation as verified, the computer readable instructions cause the computing device to:

instruct payment settlement in accordance with the respective contract; and store payment results to the data store.

8. The computing device of claim 7, wherein the participation is verified by an independent third party service and recorded in the blockchain.

9. The computing device of claim 1, wherein, responsive to the participation as verified, the computer readable instructions cause the computing device to:

record an amount of tokens to an account of the respective quote bidder stored on the data store, wherein the amount of the tokens is responsive to either or both of:

an amount of payment in accordance with the respective contract; or a verified performance measure related to the market service.

10. The computing device of claim 9, wherein the respective quote bidder is a residential customer and the amount of the tokens are rewards that are spendable for the respective merchant product or service at merchants participating in a rewards program maintained using the blockchain.

11. The computing device of claim 9, wherein, the computer readable instructions cause the computing device to record the amount of the tokens to an account of the respective quote bidder stored on the blockchain.

12. The computing device of claim 11, wherein:
the tokens reflect a verified performance measure of any one or more of:
a green house gas reduction; or
clean energy generated by a renewable or non-fossil fuel source; and
the amount of the tokens is determined in accordance with a regulatory or other program.

13. The computing device of claim 12, wherein the tokens are transferable via a credits market.

14. The computing device of claim 1, wherein the quote comprises a credibility weighting factor for selecting between the respective tenders in response to a credibility score associated to the respective quote bidder, wherein the automated market clearing operations are responsive to the credibility weighting factor and credibility scores of the plurality of quote bidders to maximize a likelihood of successful performance under the respective contracts for the quote.

15. The computing device of claim 14, wherein the computer readable instructions cause the computing device to determine the credibility score for the respective quote bidder, wherein the credibility score is responsive to participation by the respective quote bidder in a set of recent quotes available for bidding by the respective quote bidder.

16. The computing device of claim 15, wherein, for each of the quotes in the set of recent quotes:
no bidding has a neutral impact to the credibility score;
bidding or successful participation in a concluded contract has a positive impact to the credibility score; and
cancellation or unsuccessful participation in the concluded contract has a negative impact to the credibility score.

17. The computing device of claim 16, wherein the positive impact or the negative impact is weighted in response to the credibility weighting factor of a particular quote in the set of quotes.

18. The computing device of claim 1, wherein the quote comprises a gate defining a time within which to receive the respective tenders in reply to the quote and wherein the automated market clearing operations are responsive to the gate.

19. The computing device of claim 1, wherein the respective tender comprises a participation rate for the respective DER device and wherein the automated market clearing operations are responsive to the participation rate for the respective DER device.

20. The computing device of claim 1, wherein the automated market clearing operations are responsive to any one or more of:
a bid price;
a quantity to be supplied or consumed;
a location of the respective DER device;
the device type of the respective DER device;
a credibility weighting factor and a user credibility score;
a participation rate of the respective tender;
a time the respective tender is received; or
whether the respective DER device is previously scheduled for participation in another contract during a same time as performance of the respective contract under the quote.

21. The computing device of claim 1, wherein the computer readable instructions cause the computing device to:
receive quote bidder information to enroll the respective quote bidder to the platform, the quote bidder information including DER device information with which to confirm the respective DER device; and
communicate with the control agent for the respective DER device to verify eligibility to enroll.

22. The computing device of claim 1, wherein:
the computer readable instructions cause the computing device to provide an interface for the quote initiator to provide quote information defining the quote; and
the interface for the quote initiator is configured to present respective controls to receive the quote information in response to a selection of the market service.

23. The computing device of claim 1, wherein the computer readable instructions cause the computing device to provide an interface for a quote bidder to provide default tender information for automatically replying to quotes from the quote initiator using the default tender information.

24. The computing device of claim 1, wherein the computing device comprises one peer device of a peer-to-peer network implementing the blockchain.

25. A method to provide a platform for transacting energy services:
receiving a quote for providing a market service, the quote received from a quote initiator to establish at least one contract for providing the market service, wherein the market service is a selected one of a plurality of market services for energy generation, distribution or consumption;
communicating the quote to a plurality of quote bidders, each quote bidder associated with a respective distributed energy resource (DER) device of respective DER devices capable of performing the market service;
receiving respective tenders in reply to the quote, the respective tenders received from at least some of the plurality of quote bidders;
storing the quote and the respective tenders to a data store;
performing automated market clearing operations to automatically and transparently clear the respective tenders based on a gate closure for the quote and a ranking based on criteria comprising a device type of the respective DER device associated with each quote bidder of the plurality of quote bidders, wherein the automated market clearing operations are executed on a computing device to generate optimized device control parameters based on the criteria and the gate closure;
storing market clearing result information to the data store;
for a respective tender accepted for the quote by the automated market clearing operations:
establishing a respective contract of respective contracts between the quote initiator and a respective quote bidder associated with the respective tender in response to the quote and the respective tender;
automatically adjust operation of the respective DER device associated with the respective quote bidder to perform the market service in accordance with the respective contract, wherein the respective DER device associated with the respective quote bidder is automatically adjusted via control signals using a control agent to physically adjust, in real-time, a first energy generation or consumption of the respective DER device associated with the respective quote bidder;
verifying participation of the respective DER device associated with the respective quote bidder in performance of the market service; and
storing the participation as verified to the data store;

receiving performance measures of the respective DER devices, the performance measures made during performance of the respective contracts;

storing the performance measures for either or both of presenting to platform participants or verifying the participation;

receiving participation verification information from one or more metering agents monitoring the participation of the respective DER devices to verify respective participation in the respective contracts;

communicating blockchain information associated with a blockchain to participants in the platform for transparency of platform operations, the blockchain information including any one or more of: participant information, quote information, tender information, market clearing information, participation information for the respective contracts, payment information, token information, or rewards information;

receiving respective merchant product or service information and merchant offer information and publish respective merchant offers for spending rewards issued in response to verified participation;

communicating notifications of the quote to the plurality of quote bidders, the plurality of quote bidders determined in response to the market service and the device type of the respective DER device associated with the quote bidder;

for the respective quote bidder, any one or more of: providing an upcoming quotes interface for quotes available for a bid by the respective quote bidder; providing an in progress interface for the respective tender of the respective quote bidder accepted by the platform and where performance under an associated contract is not complete; or providing a history interface to present past event information comprising any one or more of tokens and/or reward spending information, information for each quote communicated for the respective quote bidder, including for quotes where no reply was communicated, quotes where a tender reply was not accepted, and quotes where the tender reply was accepted; and for the quote initiator, any one or more of:

providing an incoming services dashboard interface for presenting quote information for quotes received for bidding;

providing an outgoing services dashboard interface presenting quote information for quotes initiated for bidding on by another platform participant; or providing a payments dashboard interface for presenting payment information for quotes.

* * * * *